United States Patent [19]
Hugenell

[11] Patent Number: 4,991,948
[45] Date of Patent: Feb. 12, 1991

[54] REFLECTOR TELESCOPE

[76] Inventor: Hermann Hugenell, Maxdorfstr. 47, D-6715 Lambsheim, Fed. Rep. of Germany

[21] Appl. No.: 275,088
[22] PCT Filed: Apr. 9, 1987
[86] PCT No.: PCT/DE87/00159
§ 371 Date: Dec. 27, 1988
§ 102(e) Date: Dec. 27, 1988
[87] PCT Pub. No.: WO88/06743
PCT Pub. Date: Sep. 7, 1988

[30] Foreign Application Priority Data

Mar. 6, 1987 [DE] Fed. Rep. of Germany ....... 3707642

[51] Int. Cl.⁵ .................. G02B 23/16; E04B 1/346; F16M 11/16
[52] U.S. Cl. .................................. 350/568; 52/64; 248/183
[58] Field of Search .............. 350/568, 537; 52/64, 52/66; 248/181, 183

[56] References Cited

U.S. PATENT DOCUMENTS 3,503,664  3/1970  Hagley ........................ 350/503
3,603,664  9/1971  James ........................... 350/568
3,791,713  2/1974  Maukay ....................... 350/568
3,842,509 10/1974  Wyman et al. .................. 33/645

FOREIGN PATENT DOCUMENTS 0667935  6/1979  U.S.S.R. ............................ 350/568
1188578  4/1970  United Kingdom .

OTHER PUBLICATIONS

Journal of the Optical Society of America, vol. 72, No. 1, Jan. 1982, A. B. Meinel, "CostRelationships for Nonconventional Telescope Structural Configurations".
Journal of Scientific Instruments, vol. 3, No. 3, Mar. 1970, S.C.B. Gascoighe: "Optical Telescopes", pp. 165–172.

Primary Examiner—Bruce Y. Arnold
Assistant Examiner—Ronald M. Kalkmara
Attorney, Agent, or Firm—McGlew and Tuttle

[57] ABSTRACT

Reflector telescope, consisting of a tube (2) disposed in a spherical casing (1) and an outer framework (4) in which the spherical casing (1) is mounted. In known reflector telescopes, the tube is rotatable about its polar and declination axis, requiring two different driving systems. Moreover, access to the spherical casing is variable according to the position of said casing. These disadvantages are avoided by mounting the spherical casing (1) within the outer framework (4) to rotate about a horizontal axis (8), and by mounting said framework on a base to rotate about a vertical axis (50). Fixed and permanent access to the spherical casing (1) and therefore to the tube (2) is thus ensured, and the provision of a driving force for the spherical casing (1) is easily achieved.

17 Claims, 22 Drawing Sheets

REFLECTOR TELESCOPE

FIELD AND BACKGROUND OF THE INVENTION

The invention relates to a reflector telescope including a tube disposed in a spherical casing wherein the spherical casing is mounted in an outer framework. Such a reflector telescope is known from U.S. Pat. No. 3,791,713. Therein, the spherical casing is supported within the outer framework on an air cushion, and is rotatable by means of special drives about the polar and declination axis. The expenditure for the two different driving systems, by means of which the spherical casing is rotatable independently about its two axes, is disadvantageous. It is disadvantageous, further, that access to the sphere itself is variable according to the position of said casing, thus complicating access to the observation cabins assigned to the tube.

SUMMARY AND OBJECT OF THE INVENTION

It is the object of the invention, therefore, to provide a reflector telescope of the mentioned species such that the provision of driving systems for the necessary rotational movements of the spherical casing is more easily achieved, and that fixed and permanent access to the spherical casing in any rotational position is ensured through always the same entrance.

The solution for this object results from the mounting of the spherical casing within the outer framework to rotate about a horizontal axis and the mounting of the outer framework on a base to rotate about a vertical axis wherein the spherical casing supported in the outer framework by means of hydrostatic slide bearings. By mounting the spherical casing to rotate about a fixed horizontal axis and by mounting the outer framework to rotate about a fixed vertical axis, the bearings of the spherical casing can be simplified considerably, and fixed and permanent access to the spherical casing can be ensured. For this aim, the invention provides walk tubes in the horizontal axes of the spherical casing, said walk tubes being rigidly connected with the latter. Further, the invention provides walk platforms in said walk tubes, said walk platforms being rigidly connected with the outer framework. In this way, for each rotational position of the spherical casing, permanent access to the spherical casing is ensured.

Further advantageous embodiments of the invention result from the subclaims. Special attention should be directed to the particularly favourable hydrostatic slide bearing of the spherical casing being suspended on a very thin oil film and being rotatable easily about its horizontal axis. In the same way, the outer framework is supported. The spherical casing consists in a particularly advantageous manner of carbon fibers having low weight. The supporting sections of the tube may also be made of this material.

Finally, the invention provides in a particularly advantageous manner that the elevators arranged within the spherical housing are provided with spherical inner elevator walls being mounted within the outer elevator walls such that the elevator stand platforms are disposed for any rotational position in the horizontal plane of the walk platforms of the walk tubes. Thus, using the elevators within the spherical housing is possible in any rotational position.

By the provision of the reflector telescope according to the invention, the primary reflector itself remains unloaded by weight forces of the sphere construction. All weights around the primary reflector are supported such that no tension/compression forces will be exerted on the latter. Further, both supports of the spherical casing are loaded identically in any rotational position. Thus, there is an absence of load in the supports of the spherical casing for any rotational position, as the load is absorbed in the outer framework. The hydrostatic bearing of the spherical casing has approximately the aeral dimensions of the primary reflector and consists of hydrostatic support elements arranged in diagonal rows. The spherical casing can be turned by approx. 150° from horizon to horizon. In contrast to the spherical casing being made preferably of carbon fibers, the construction of the outer framework consists of a steel structure.

The invention relates, further, to the provision of the reflector telescope comprising the primary reflector formed by individual adjustably supported reflector segments, a tube concentric to said primary reflector and provided with observation cabins, and a supporting bars structure for said tube.

A reflector telescope of this species is known as Mauna Kea reflector telescope having a reflector diameter of 10 m, said reflector telescope being still in the planning stage to become the biggest reflector telescope in the world (Sterne und Weltraum 1984, 8 to 9, page 112). In this reflector telescope, the primary reflector is composed of 36 hexagonal reflector segments forming the reflector surface in a honeycomb structure, in the center of which a reflector segment being omitted for observation purposes in the Cassegrain focus. Manufacture of the individual hexagonal reflector segments themselves is very problematic. They are off-axis segments of a paraboloid to be cut in hexagon shape. When manufacturing, as part to be fashioned, a circular part is selected to be deformed by accurately defined shearing and bending forces acting on the borders. Into the deformed blank, a spherical shape is ground. Then, the forces exerted are removed. As far as the forces have been selected properly, the reflector segment accepts the desired shape of a paraboloid segment after unloading. It has been found out, however, that faults occur when cutting to hexagonal shape, such that manufacture of the individual reflector segments is extremely expensive. Furthermore, depending on the position of the telescope, on thrusts due to wind and on temperature variations, the positions of the individual hexagonal reflector segments have to be readjusted. For this purpose, the support points of each reflector segment are connected with three position controllers to refocus the reflector segments and to adjust it in two inclination directions. At the rear-side edges, sensors are provided measuring the displacements of adjacent reflector segments with respect to each other. Together with three inclination sensors measuring the total curvature of the reflector segment, they provide information to be processed in a computer system controlling the in total 108 position controllers. With in total 168 different sensors, redundancy is large enough that failure of individual sensors can be overcome. In this arrangement, however, the front sides of the reflector segments are left free from disturbing monitoring systems, occasionally, only, a readjustment has to be performed by means of a constellation, such that even infrared observations will be possible by day. Sensors and position controllers must operate with an accuracy of at least 50.

Further, one-piece primary reflectors for the reflector telescopes are known, e.g. the 3.5-m telescope for the Max-Planck-Institut für Astronomie (Zeiss Informationen, vol. 94, 1982, pages 4 ff.). Here, the reflector body is made of glass ceramics (ZERODUR) having a low temperature coefficient of expansion. The reflector surface is ground as higher-order hyperboloid of revolution, and is polished. Standard deviation is max. 30 mm, measurement is effected by means of a laser interferometer. Support of the reflector body is achieved over a 18-points support.

The following requirements apply for such reflector telescopes:

1. As much radiation energy as possible should be collected, this is proportional to the collecting surface of the primary reflector. As a consequence, the diameter of the primary reflector should be as large as possible. The diameter is, however, limited by technical and economical conditions.

2. Radiation collected of a star should be concentrated as sharply as possible on a point in the focal plane of the reflector telescope. Quality of the optical image should be as good as possible. Disadvantages exist for earth-bound reflector telescopes because of the influence of the earth atmosphere, e.g. air turbulence. Reflector telescopes on satellite tracks do not have those disadvantages.

3. The image of the star should be held as long as possible without local variations on the image plane.

For one-piece primary reflectors, it is disadvantageous that, due to the method for manufacturing them, they are limited in diameter. The largest reflector telescope with a one-piece primary reflector is the Hale telescope having a reflector diameter of 5 m. The only known reflector telescope having a primary reflector consisting of individual reflector segments has the disadvantage that manufacture of the individual reflector segments is extremely expensive, as each reflector segment must be ground individually as a section of a paraboloid. Further, at the contact lines of the individual segments, the sensors must guarantee an accurate adjustment. The expenditure required for additional technical measures is extremely high as compared to the overall performance of the telescope. Moreover, a very complicated segment support is necessary.

Common to both types of reflector telescopes is the disadvantage that the observation cabins within the tube shadow with their total diameter the reflector surface of the primary reflector. Simultaneously, the supporting bars structures cause additional shadow areas extending in part radially over the primary reflector. These shadow areas exist for all types of focusing and cannot be prevented. This implies that reflector surfaces manufactured under high cost expenditure for the primary reflector are ineffective, as they cannot contribute to the collection of the radiation energy.

The object of the invention is, therefore, to provide a reflector telescope of the mentioned species, the individual reflector segments and segment supports of which are simple or economic, resp., in construction or manufacture, resp., and which are arranged such that shadow areas caused by the observation cabins and by the supporting bars structure of the tube are prevented.

For the solution of this object, the invention provides that the reflector segments are formed of circular disk-shaped reflector bodies and are supported on circular tracks concentric to the tube and spaced with respect to each other, such that between the individual reflector bodies, free spaces for the supports of the reflector bodies and for the supporting bars structure or for its shadow areas, resp., are formed. For the reflector telescope according to the invention, also called central-axis reflector, the supporting bars structures are arranged outside the paths of rays and do, thus, not shadow costly reflector areas, whereas the central shadow caused by the observation cabin is used in manifold ways for deflecting the incident light. In the central-axis reflector, the individual reflector segments are round reflectors, for which the difficult tension and compression conditions occurring with the hexagonal reflector segments according to the state of the art, such tension and compression conditions being effected depending on the inclined position of the tube, are prevented. For circular reflector bodies, support is technically solved for some time.

The invention is based, thus, on the combination of using reflector bodies to be manufactured simply and economically with known measures as round reflectors and of their arrangement such that between the individual reflector bodies, free spaces are formed for, on one hand, the reflector bodies and, on the other hand, for the supporting bars structure or its shadow areas, resp. Thus, when manufacturing the reflector telescope according to the invention, on one hand, the known and proven technology for the manufacture of a one-piece reflector body with adjustable supporting can be applied. Simultaneously, it is suggested, according to the invention, to arrange said one-piece round reflector bodies on circular tracks spaced from each other such that the interposed free spaces can be used for the support of reflector body, on one hand, and for the supporting bars structure or its shadow areas, resp., on the other hand.

For determining the tube diameter being, simultaneously, the maximum diameter of the primary reflector, the desired diameter of a one-piece, or one-surface reflector is taken as a base. If, e.g., an effective diameter of 20 m is desired for the primary reflector, the radius of an individual round reflector body results from the following calculation:

$$18\ r^2 = 100$$

$$r = 2.357\ m$$

Each of the 18 reflector bodies has, thus, a diameter of 4.714 m. The total diameter of the primary reflector consisting of 18 round reflector bodies is 26.946 m. Thus, the free spaces between the 18 round reflector bodies can be considered as the corresponding shadow areas of a hypothetical mono-reflector having a diameter of 29.946 m.

It is suggested, further, according to the invention, that the supporting bar structure on the entrance side of the tube consists of an orifice plate with openings, the arrangement and diameter of which corresponds to the arrangement and diameter of the reflector bodies of the primary reflector.

The invention comprises, further, the provision of a special supporting bars structure outside the paths of ray of the central-axis reflector with freely and along the central axis movable observation cabins. According to the invention, three observation cabins are provided for the central-axis reflector, said observation cabins being equipped with various deflection reflectors, depending on the desired focus. All observation cabins are movable freely and along the central axis.

BRIEF DESCRIPTION OF THE DRAWING

In the following, the invention is described in more detail based on embodiments shown in the drawing. There are.

DETAILED DESCRIPTION OF THE PREFERRED EMBODIMENT

Figure 1:
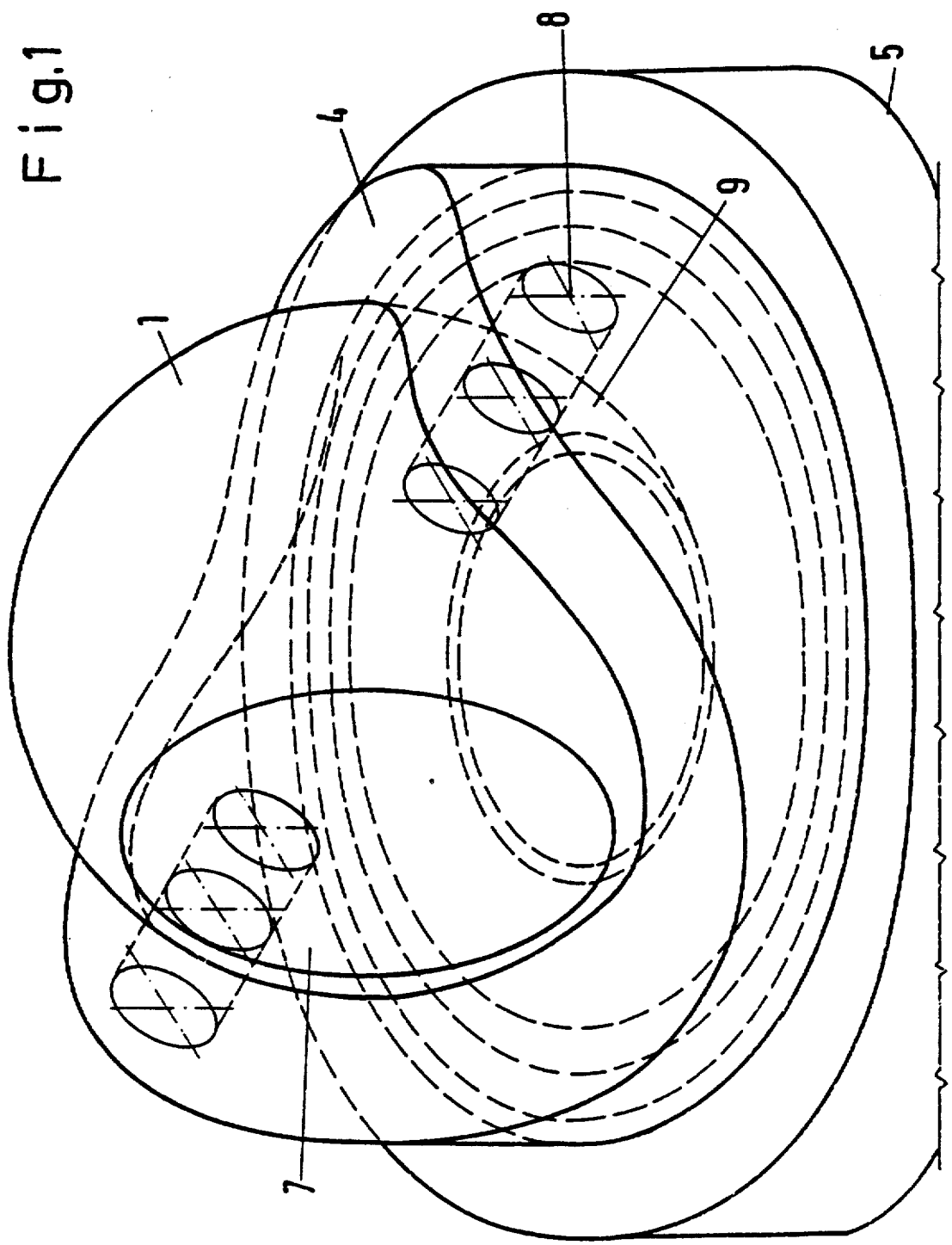
FIG. 1 is a perspective representation of one embodiment.
Figure 2:
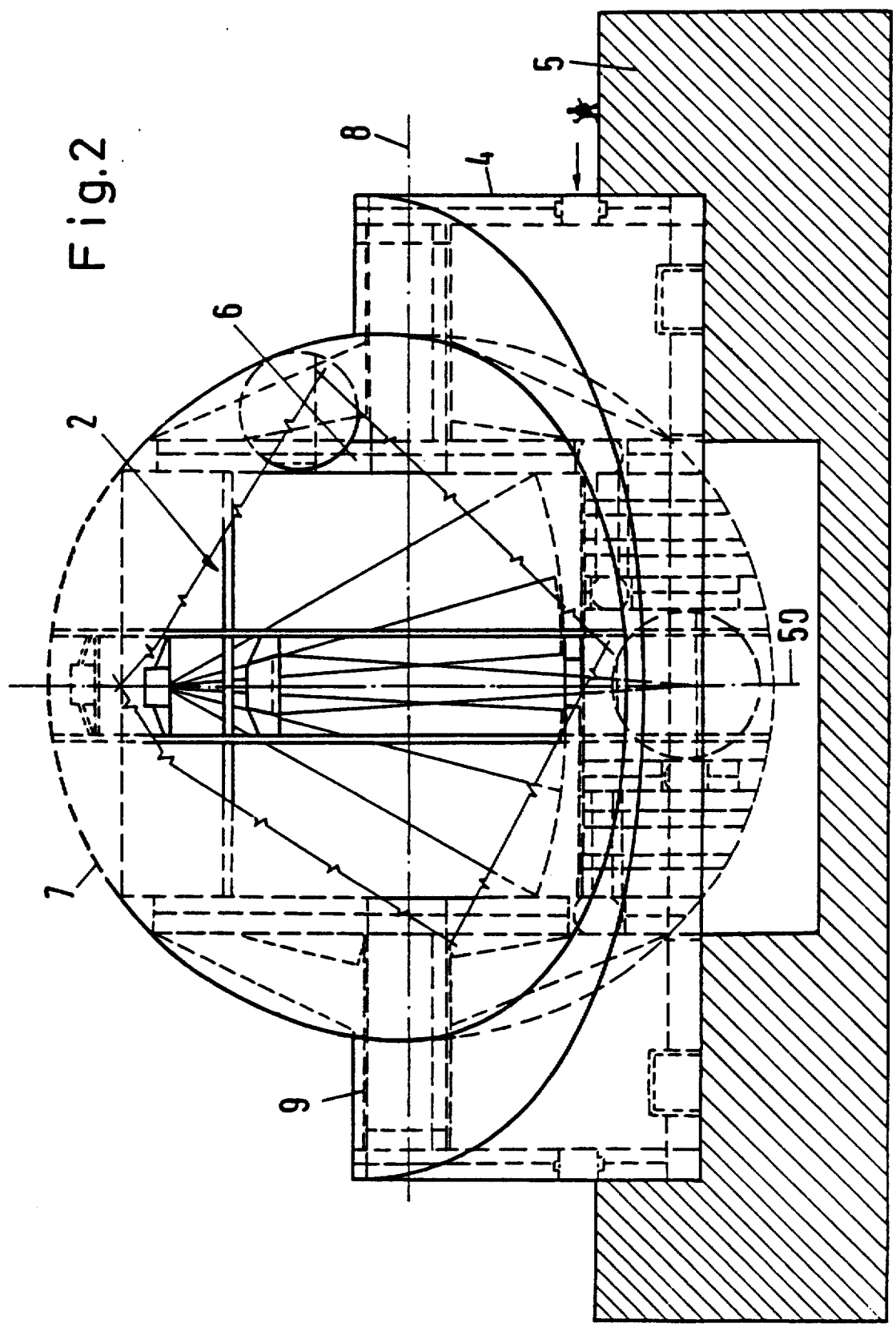
FIG. 2 is a partially sectional front view.

According to FIGS. 1 and 2, the reflector telescope consists of a spherical casing 1, a tube 2 supported therein with a primary reflector 3, of an outer framework 4 for supporting the spherical casing 1, and of a base structure 5 for supporting the outer framework 4. The tube 2 with the primary reflector 3 will be explained in detail in the second part of this description.

Figure 9:
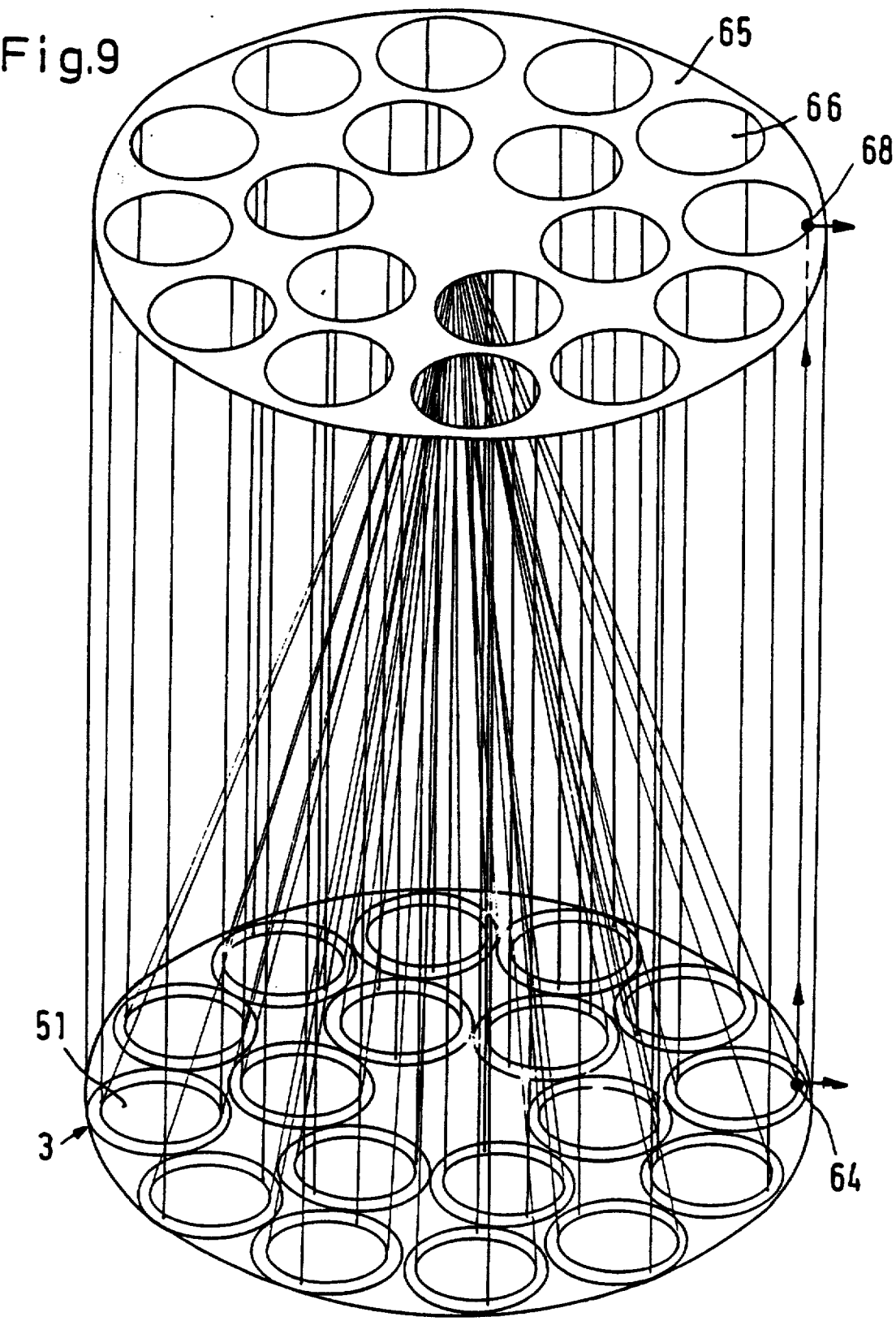
FIG. 9 is a perspective representation of the primary reflector.

The spherical casing 1 has dimensions such that the tube 2 with its outer supporting bars structure 6 extends laterally through the whole diameter of the spherical casing 1, the primary reflector 3 having, according to FIG. 2, a relatively large diameter being arranged far below the center of the sphere. In the wall opposite to the primary reflector 3 of the spherical casing 1, the so-called eye 7 of the reflector telescope is disposed, said eye 7 consisting of an orifice plate 65 with circular openings 66 being arranged exactly above the individual reflector segments 51 of the primary reflector 3 (FIG. 9).

The spherical casing 1 is mounted rotatably about a horizontal axis 8 in bearing eyes 9 of the outer framework 4. The axis 8 extending horizontally of the spherical casing 1 is formed by accessible walk tubes 10 rigidly mounted to the spherical casing 1, in said walk tubes 10 walk platforms 11 glidable therein and rigidly mounted to the outer framework 4 being disposed, as will be described later.

Around the walk tubes 10 supported by sliding or roller bearings in the bearing eyes 9 of the outer framework 4, driving elements 12 extend executed as toothed wheel gears, V-belt or toothed-belt gears or the like. They serve for turning the spherical casing 1 about the horizontal axis 8 and, thus, for adjusting the eye 7 of the reflector telescope.

Figure 3:
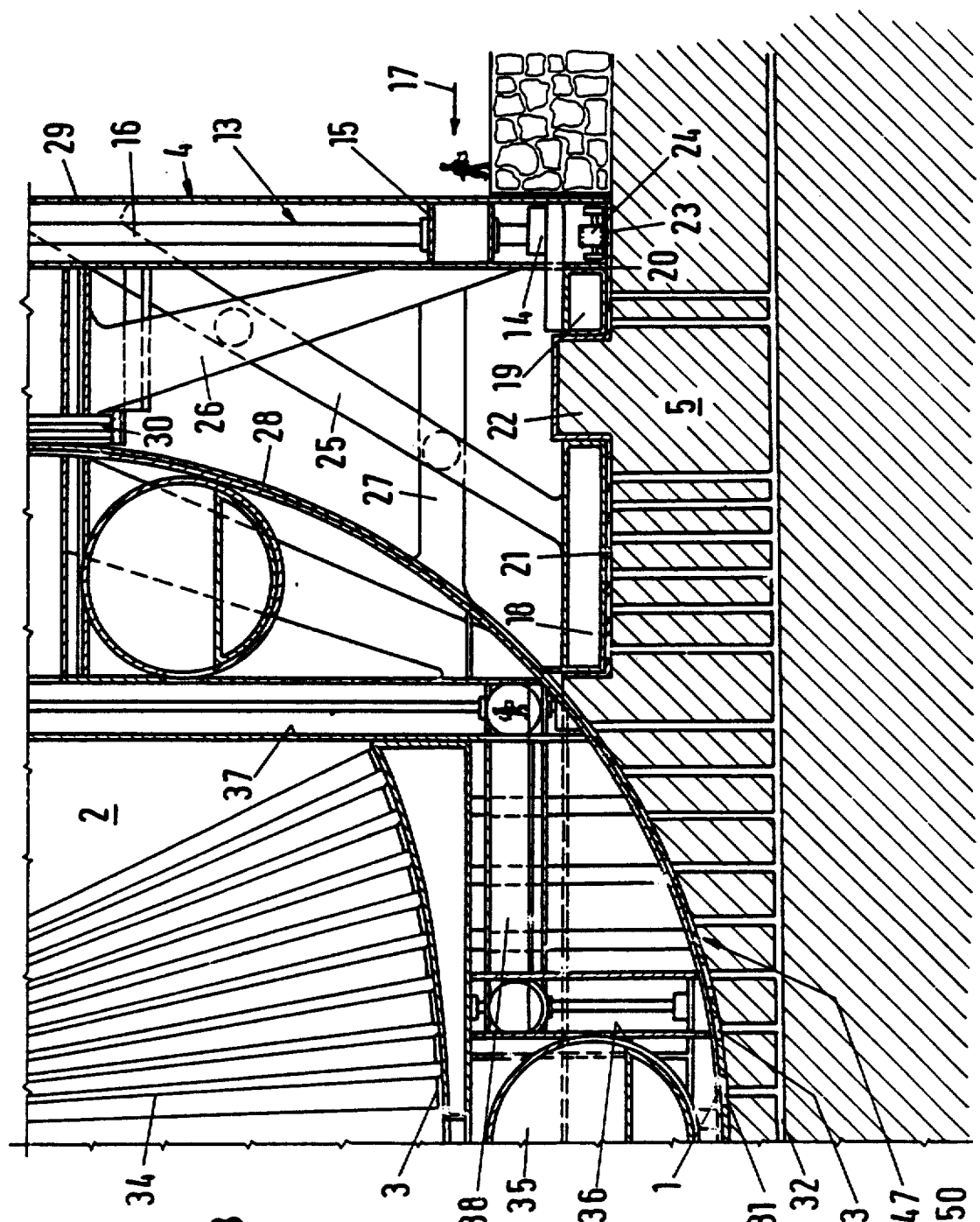
FIG. 3 is a partial cross section.

FIG. 3 shows a partial vertical cross-section through the spherical casing 1, the outer framework 4, and the base structure 5. The latter is provided on the outside with an elevator 13 with elevator motor 14, elevator cabin 15, and elevator drives 16. This elevator 13 extends in non-shown manner within the outer framework 4 to the walk tube 10 with walk platform 11 within the axis 8 of the spherical casing. Over an access 17 located on the upper side of the base structure 5, the elevator 13 provides free access irrespective of the rotational position of the outer framework 4 about its vertical axis and irrespective of the rotational position of the spherical casing 1 about its horizontal axis.

Vertically, the outer framework 4 is supported by means of two guide rings 18, 19 in corresponding guide grooves 20, 21 by means of hydrostatic slide bearings arranged within the base structure 5. The two guide grooves 20, 21 are separated radially by an annular guide support 22, the complete base structure 5 being, together with the guide support 22, made advantageously of steel concrete. Radially outside the guide groove 20, a circular toothed guide rail 23 is provided, into which a gear wheel drive 24 engages for a 360° rotatability of the outer framework 4 about its vertical axis.

The complete outer framework 4 consists of a steel structure, some beams 25, 26, 27 of which are shown in FIG. 3, which beams extend between the guide rings 18, 19 of the inner wall 28 and the outer wall 29 of the outer framework. The beams carry also the driving elements 30 for the driving elements 12 for turning the spherical casing 1 about its horizontal axis 8.

Partially within the outer framework 4 and partially within the base structure 5, a spherical segment 47 for receiving the spherical casing 1 is shown. It is supported over hydrostatic end supports 31, the pressure channels 32 and pressure pockets 33 are shown in FIG. 3. The spherical casing is, thus, supported in the outer framework 4 by means of hydrostatic slide bearings (31 to 33). They absorb the weight forces of the spherical casing 1 such that the axes 8 of the spherical casing 1 can operate nearly completely unloaded. The necessary equipment for pressure generation is not shown in detail.

Within the spherical casing 1, the primary reflector 3 is shown with its paths of rays 34. Centrally below the primary reflector 3, there is an observation cabin 35 for the Coudé focus. It is accessible over an elevator 36. Outside the periphery of the primary reflector 3, there is another elevator 37 extending within the spherical casing 1 to the walk tube 10 in the axis 8 of the spherical casing 1. Both elevators 36, 37 are connected to each other over a walkway 38, above which the working platform for the primary reflector is arranged.

Figure 4:
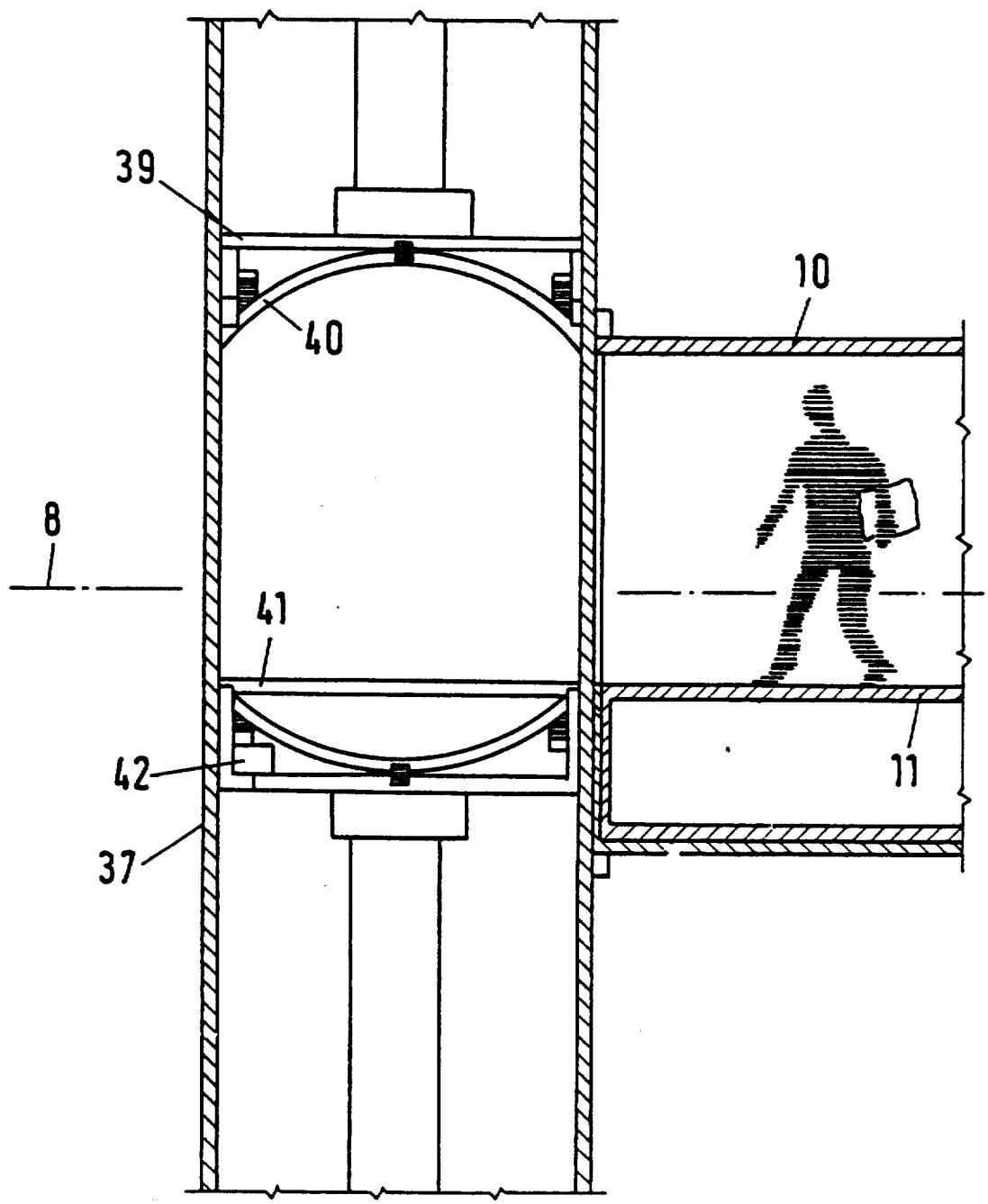
FIG. 4 is a detailed representation of the walk tube arranged within the axis of the spherical casing with adjacent elevator.

As shown in FIG. 4, each elevator cabin 39 of the elevators 36 and 37 is provided with a spherical inner elevator wall 40 being each provided with a stand platform 41. Further, drives 42 for turning the spherical inner elevator wall 40 with the stand platform 41 within the elevator cabin 39 are provided. Said drives 42 are connected with the driving elements 12 for the rotational movement of the spherical casing 1 about its axis 8 in such manner that for a clockwise rotational movement of the spherical casing 1, the spherical inner elevator walls 40 perform a corresponding counter-clockwise rotation such that the stand platforms 41 are for each rotational position of the spherical casing 1 in an horizontal plane. In equal manner, the walk platforms within a walk tube within the walkway 38 between the elevators 36, 37 is turned, too. As the walk platform 11 shown in FIG. 4 within the walk tube 10 is connected rigidly with the outer framework, and as the walk tube 10 turns together with the spherical casing 1, the walk platform 11 within the walk tube 10 and the stand platform 41 within the elevator cabin 39 are arranged always in horizontal planes such that for any inclinational position of the spherical casing 1, using the elevator installations is possible.

Figure 5:
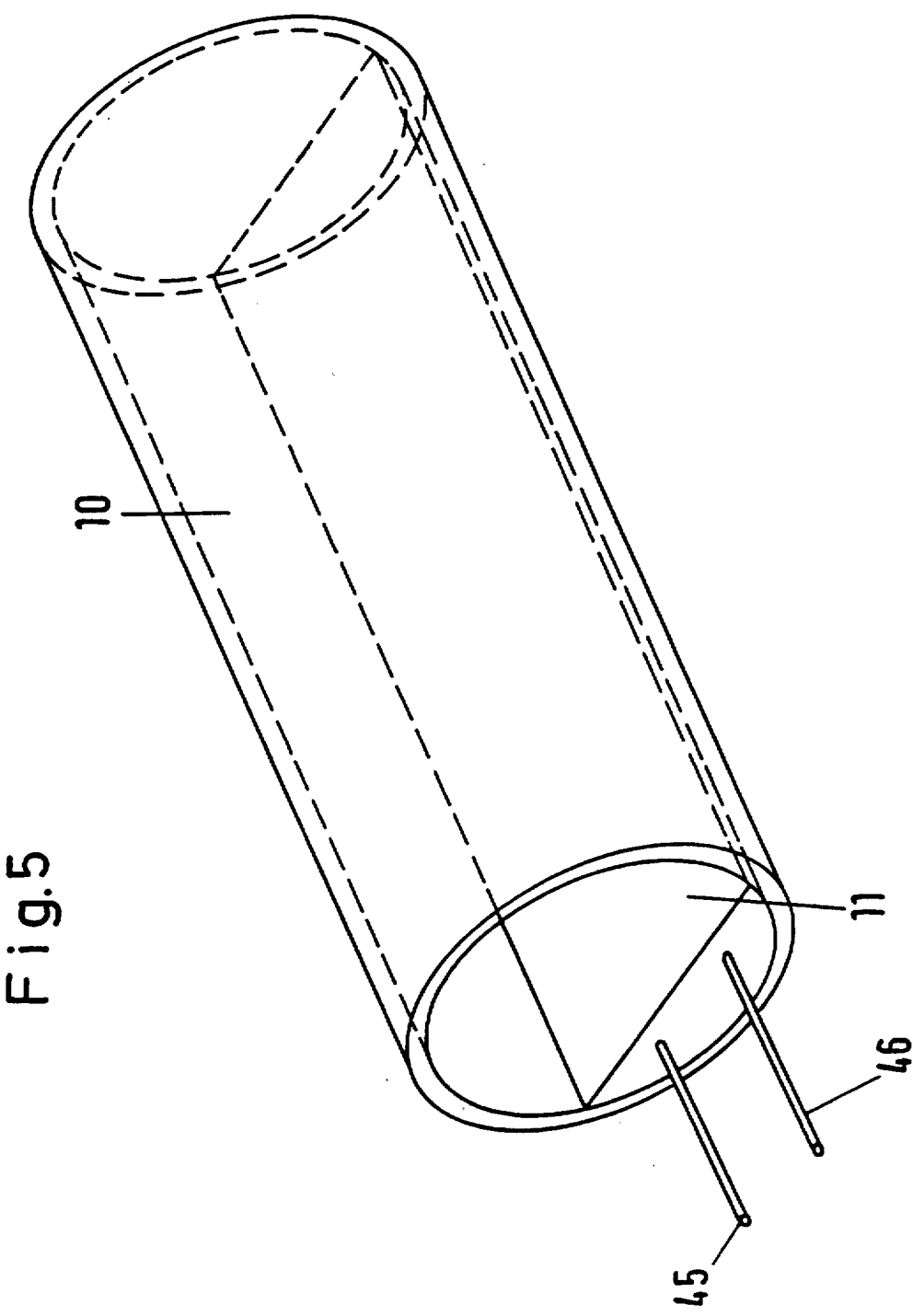
FIG. 5 is a perspective representation of the walk tube with walk platform arranged inside.
Figure 6:
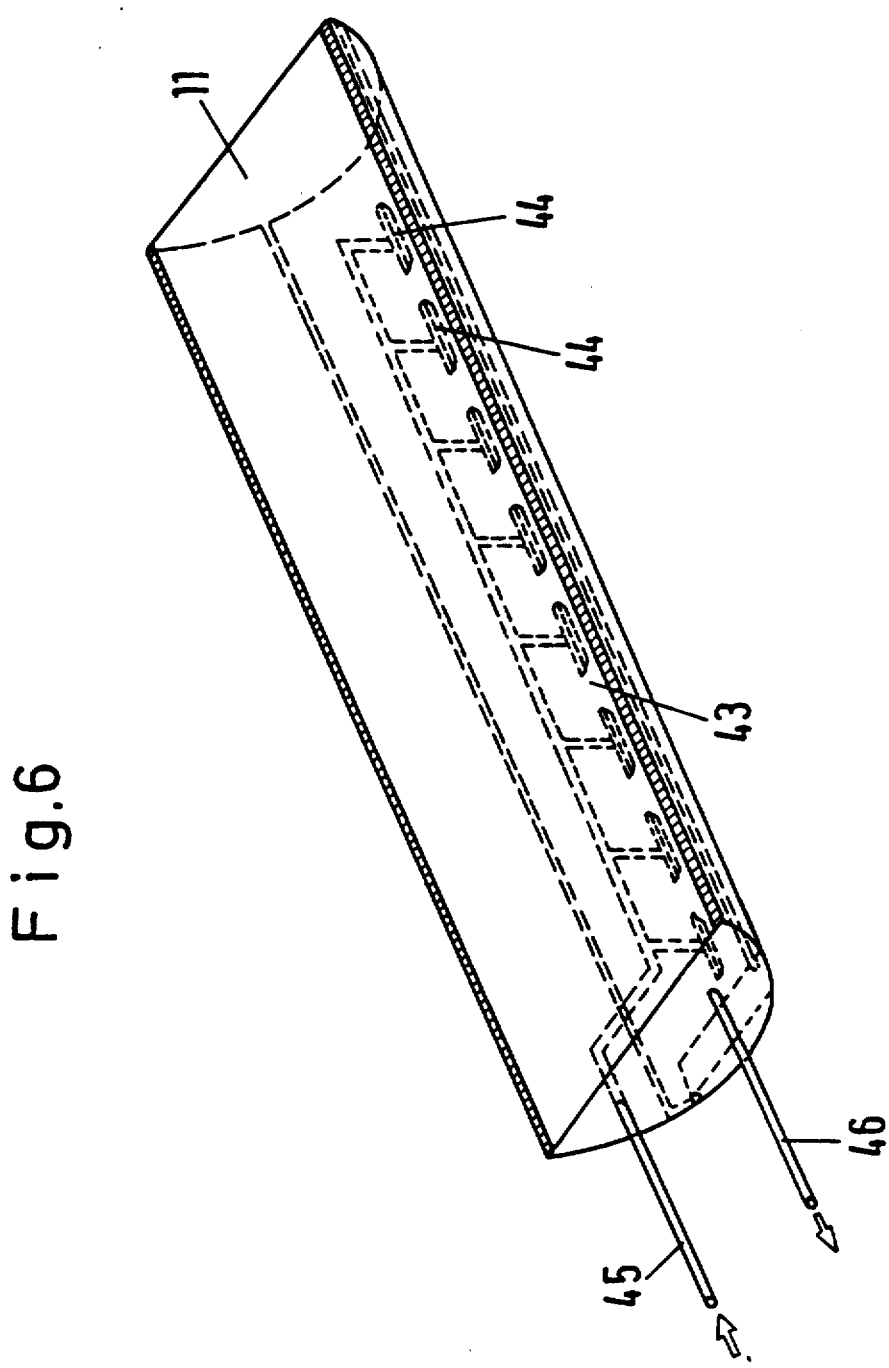
FIG. 6 is a perspective representation of the walk platform.

As shown, further, in FIGS. 5 and 6, the walk platforms 11 are supported within the walk tubes 10 over hydrostatic bearings 43, to the bearing sockets 44 of which oil can be fed over pressure pipes 45 and discharged over discharge pipes 46.

As the above description shows in connection with the drawings, the complete weight of the outer framework 4 and of the spherical casing 1 reposes on the two guide rings 18, 19 being supported in the guide grooves of the base structure 5. These guide rings 18, 19 are lifted in time by oil pressure and slide under low friction on oil films. The 360° rotation of the outer framework 4 is effected by the gear wheel drive (23, 24), on either side of the toothed guide rail 23 rails being arranged, on which the weight of the necessary electric motors reposes. As the weight of the outer framework 4 is supported on an oil film, no load of the outer framework 4 has, here, to be transferred.

In an equal manner, the spherical casing 1 is supported on pressure cushions generated by means of the pressure pockets 33. For inclining the spherical casing 1 by 75° each on either side—as seen from the vertical position of the eye 7—no large forces are, thus, required. They can be exerted by an electric motor of low performance. When the telescope is switched off, all loads repose on the spherical segment 47 and the guide rings 18, 19 such that the spherical casing 1 is, then, safely locked in position.

Figure 7:
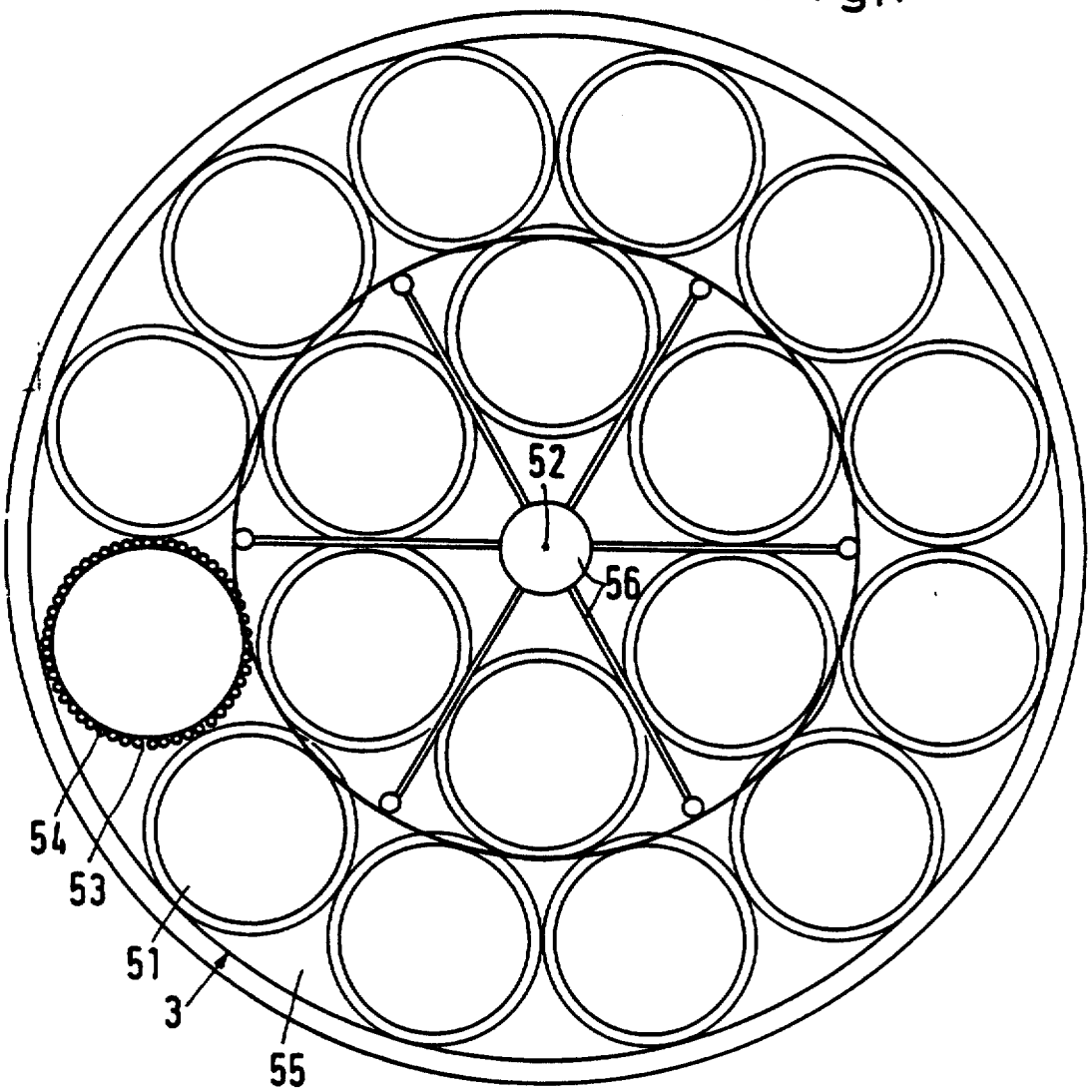
FIG. 7 is a top view of the primary reflector.

FIG. 7 shows a top view of the primary reflector 3 of the reflector telescope being formed by 18 adjustably supported reflector segments, each consisting of a circular-disk-shaped, round reflector body 51. They are supported in circular tracks concentric to the central axis 8 spaced from each other such that between the individual reflector bodies 51, free spaces 53 for the bearing 54 of the reflector bodies 51 and free spaces 55 for a supporting bar structure 55 or for its shadow areas, resp., are formed.

Each reflector body 51 consists of a one-piece round reflector, the whole surface of which is ground without the cutout of a central opening. Such round reflectors—however with a central opening—are known with respect to manufacture and supporting. Reference is made, e.g., to the description of the 3.5-m Zeiss telescope for the Max-Planck-Institut für Astronomie in "Zeiss Informationen" vol. 94, Nov. 1982. Such a reflector body comprises a reflector bearing 54 with radial tension/compression load release, for which purpose load release elements are provided at the periphery of the reflector body 51, for said load release elements the free spaces 51 being provided.

The outer diameter of the primary reflector 3 and, thus, the tube diameter results from the desired effective reflector diameter of a hypothetical mono-reflector. If the 18 individual reflectors 51 are intended to replace a mono-reflector of 20 m diameter, the following calculation is made:

Surface area of the mono-reflector of 20 m diameter:

$$A^* = 100\pi = R^{*2}\pi$$

Central-axis reflector with 18 reflectors:

$$18\, R^2\pi = 100\pi$$

$$18\, R^2 = 100$$

$$r = 2.357 \text{ m}$$

Each of the 18 reflectors has, thus, a diameter of 4.71 m.

By the arrangement of the 18 reflector bodies 51 of the mentioned diameter on two circular tracks radial to the central axis 52, the inner circular track of which containing six reflector bodies 51 and the outer circular track of which containing twelve reflector bodies 51, a total outer diameter of the primary reflector 3 and, thus, of the tube of 26.946 m results.

The hypothetical mono-reflector of 20 m diameter and, thus, of a reflector surface area of $A^* = 100\pi$ is, thus, replaced by 18 individual reflector bodies 51 of identical total surface area. Because of the reflector support, the diameter of the central-axis reflector extends to in total 26.946 m. Thus, the free spaces 53, 55 between the 18 reflector bodies are to be treated as the corresponding shadow areas for a hypothetical mono-reflector with 26.946 m diameter.

Figure 8:
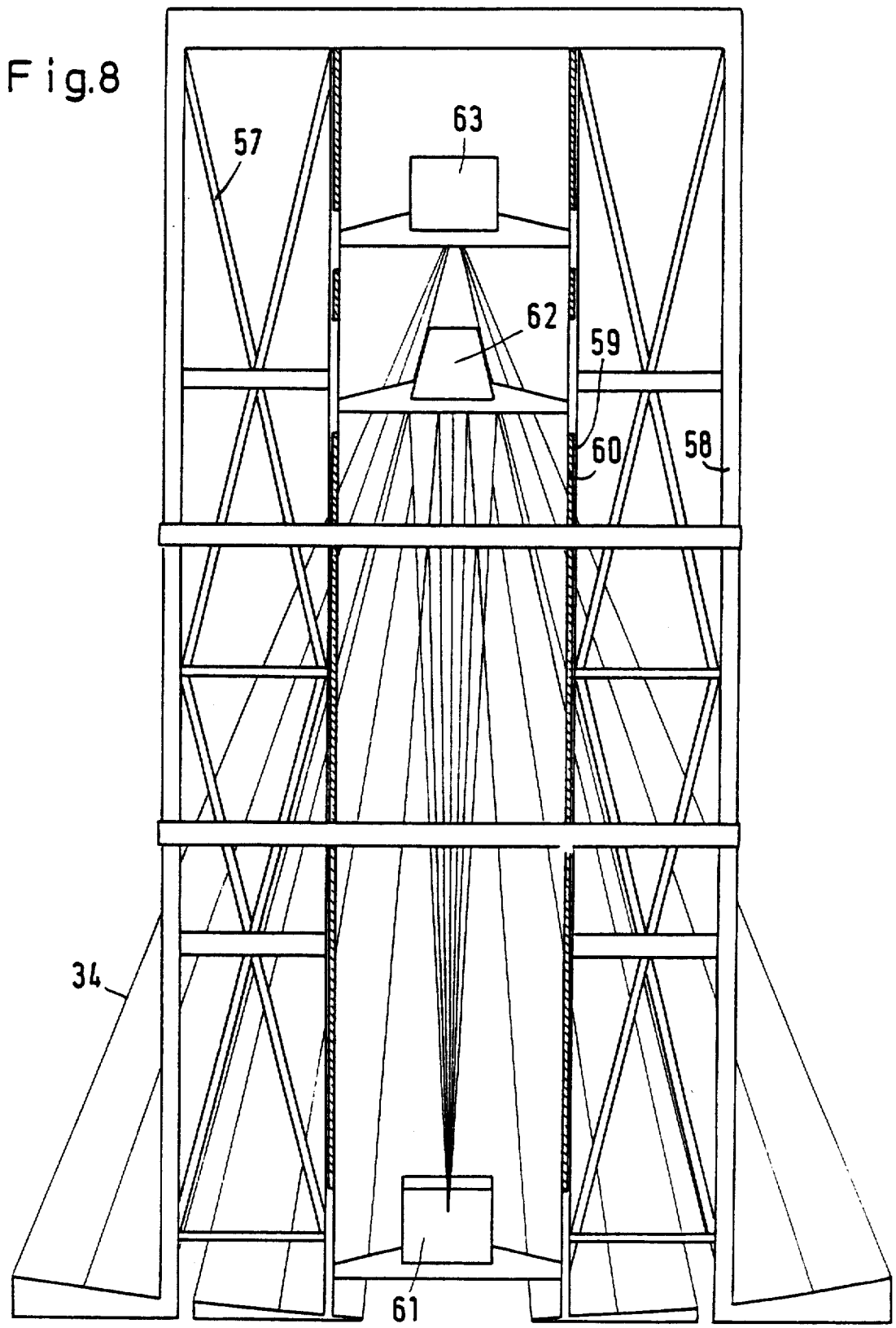
FIG. 8 is a schematic section along the central axis of the primary reflector.

The supporting bars structure 56 of the parabolically shaped primary reflector 3 described later in more detail is shown in FIG. 8 in a schematic section along the central axis 52. It comprises central holder tubes 58 forming a static support structure for the tube 2, and inner guide tubes 59 being provided with guide rails 60 for guiding three observation cabins 61 to 63. In the arrangement according to FIG. 8, the lower observation cabin 61 serves for the observation in the Cassegrain focus with six and with eighteen reflectors. The central observation cabin 62 serves for the observation in the Cassegrain focus with six reflectors. The upper observation cabin 63 serves for the observation in the primary and in the Cassegrain focus with eighteen reflectors. The respective paths of rays 34 of the rays reflected by the eighteen reflector bodies 51 are each shown with their marginal rays. FIG. 8 shows the parabolic shape of the primary reflector 3, which will be described later in more detail, and further the grid-type struts 57 between the central holder tubes 58 and the inner guide tubes 59, which will be described later in more detail.

The adjustment of position of the eighteen reflector bodies 51 is achieved according to FIG. 9 by means of laser pulse transmitters 64 not shown in detail, said laser pulse transmitters 64 being arranged on the border of each reflector body 51 such that they can provide, for accurate focus adjustment, pulses to a receiver 68 arranged vertically above at an orifice plate 65 with openings 66 and controlled by a computer. A deviation, if occurring, of the position of the reflector body 51 from the predetermined position is calculated by the computer and is compensated immediately by means of the adjustable bearing 54 of each reflector body 51. Suitably, the bearings 54 are oil-pressure bearings, in order that necessary variations of position, too, can be performed over oil pressure.

The bearings 54 of each reflector body 51 are not shown in detail in the figures. For this purpose, known and proven bearings may be used, such bearings being applied, e.g., often by Carl Zeiss company in Oberkochen/Federal Republic of Germany. Such bearings have radial support systems with a plain compression and tension/compression release. The individual support points are distributed in a hydraulic support system. The reflector load release is effected over hydraulic double chambers.

Grinding of the primary reflector 3 consisting of the 18 reflector bodies 51 as per the embodiment is effected by means of a guide block 69 arranged concentrically about the central axis 52 of the primary reflector 3, at the inner side of said guide block 69 a carriage 70 being slidable on an oil film and being guided at a radial arm 71, which is, in turn, supported in the central axis 52. Along said radial arm 71, polishing/grinding disks 72 are radially displaceable and are equipped with their own rotation drives. By means of this grinding arrangement, all eighteen reflector bodies 51 can be ground and polished accurately, whereby the desired paraboloid shape is achieved. Testing the surface is performed in a manner not shown in detail by means of a zero-test laser interferometer, under the condition, of course, that the individual reflector bodies 51 are adjusted and supported on a common focus of the primary reflector 3. This adjustment of position is achieved in the way as shown in FIG. 8 and as described together with the latter.

Figure 10:
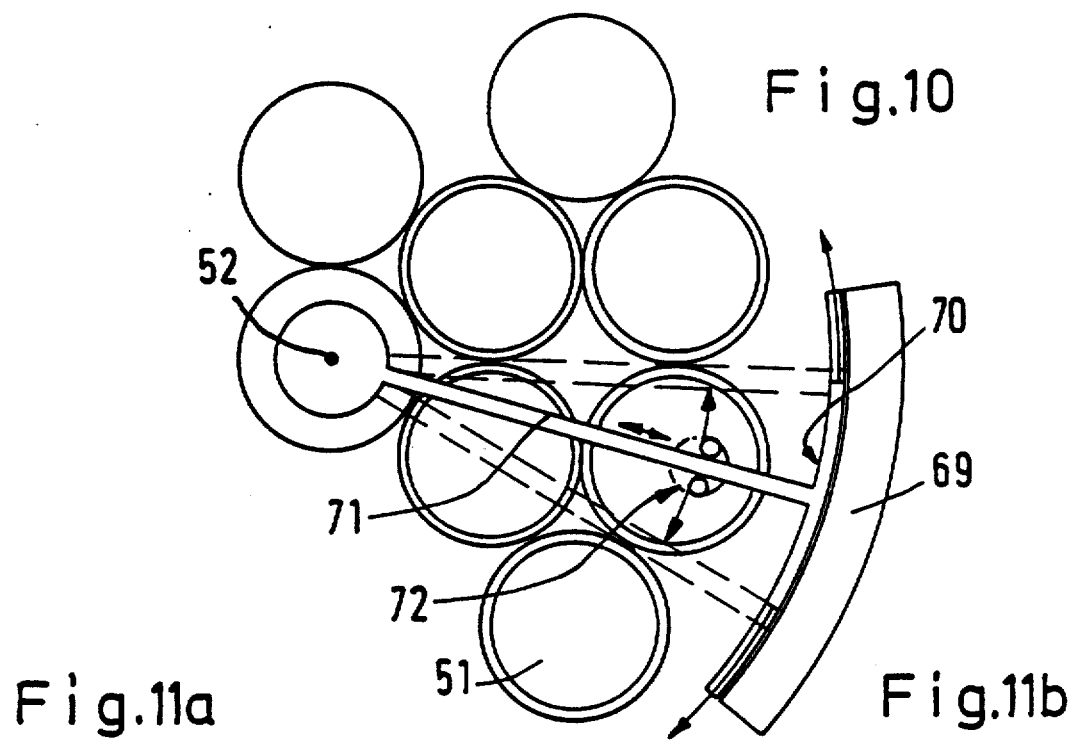
FIG. 10 is a schematic representation of the grinding method for the primary reflector.
Figures 11A, 11B:
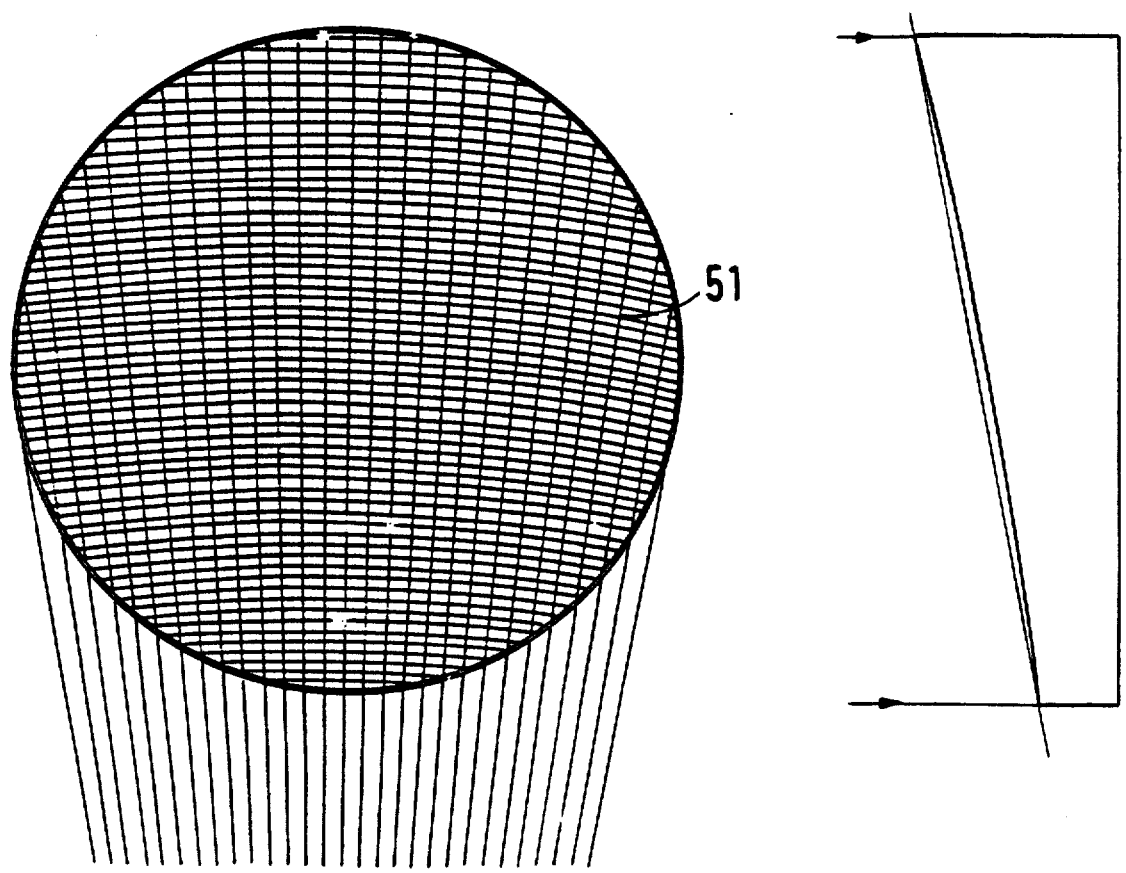
FIGS. 11a and 11b are representation of an individual reflector body.

The shape and grinding of the individual reflector bodies 51 can be seen from FIG. 11a. Because of the grinding methods as described together with FIG. 10, the individual reflector bodies 51 do not have an axially symmetric shape. Its surface curvature is part of the hypothetical large mirror constructed as primary reflector 3 with parabolic surface, the surface curvature of the reflector bodies forming each circular sections thereof. Thus, an accurate focus in the central axis 52 is achieved. The outer twelve reflector bodies can be minimised in their outer border elevation for weight saving purposes, as shown in FIG. 11b.

Figure 12A:
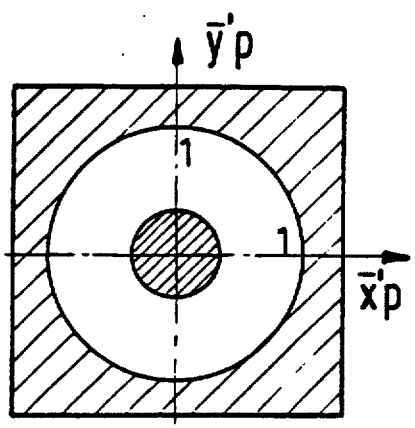
FIGS. 12a, 12b and 12c are functional diagram representations.
Figure 12B:
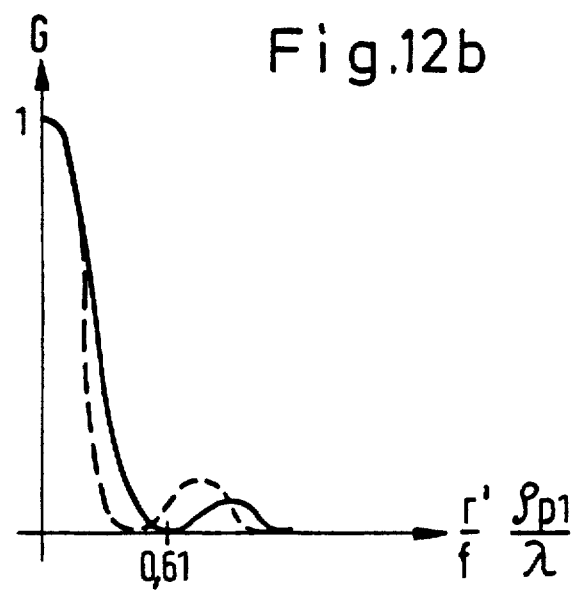
Figure 12C:
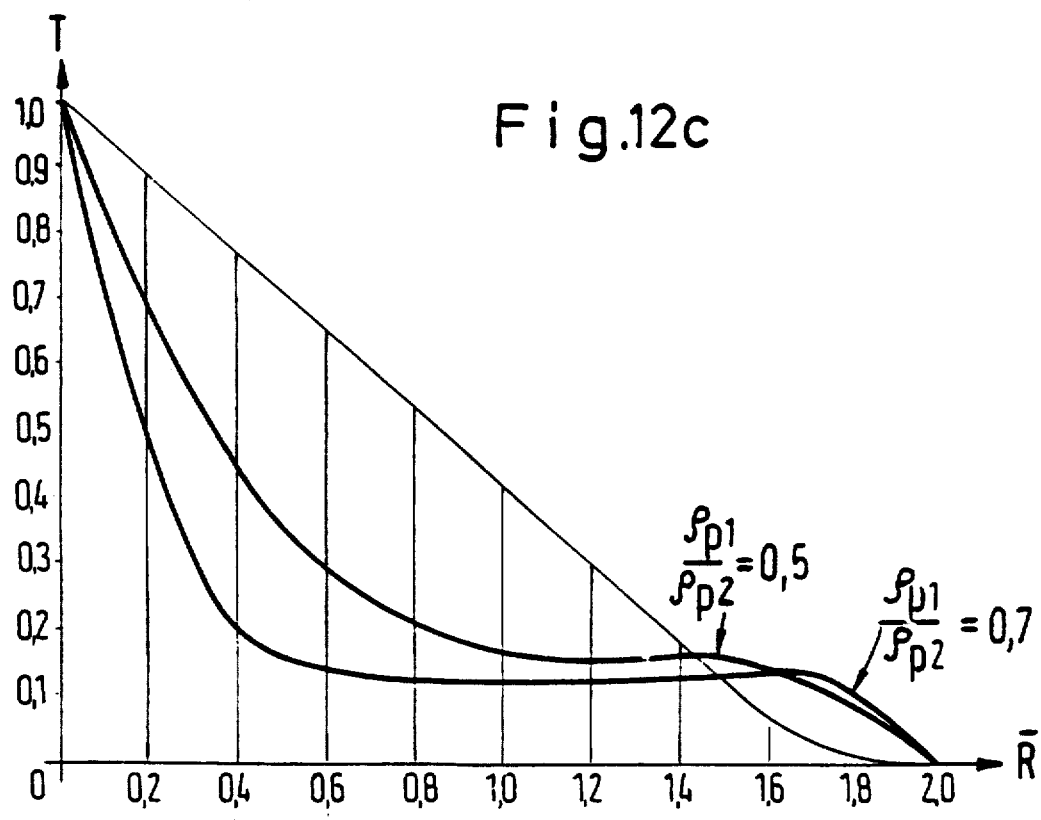

FIG. 12 shows with its various sections the effects of the central shadowing, i.e., of the center of the primary reflector 3, in which center itself no reflector body 51 being arranged, as shown in FIGS. 7 and 9. The shown and described central axis reflector improves the resolution and reduces, simultaneously, the contrast for medium local frequencies (FIG. 12a). The point image function is improved by the central shadowing according to the invention (broken line in FIG. 12b) as compared to known point image functions (FIG. 12b). Finally, the modulation transmission function, too, is improved by the central shadowing according to the invention according to FIG. 12c.

Figure 13:
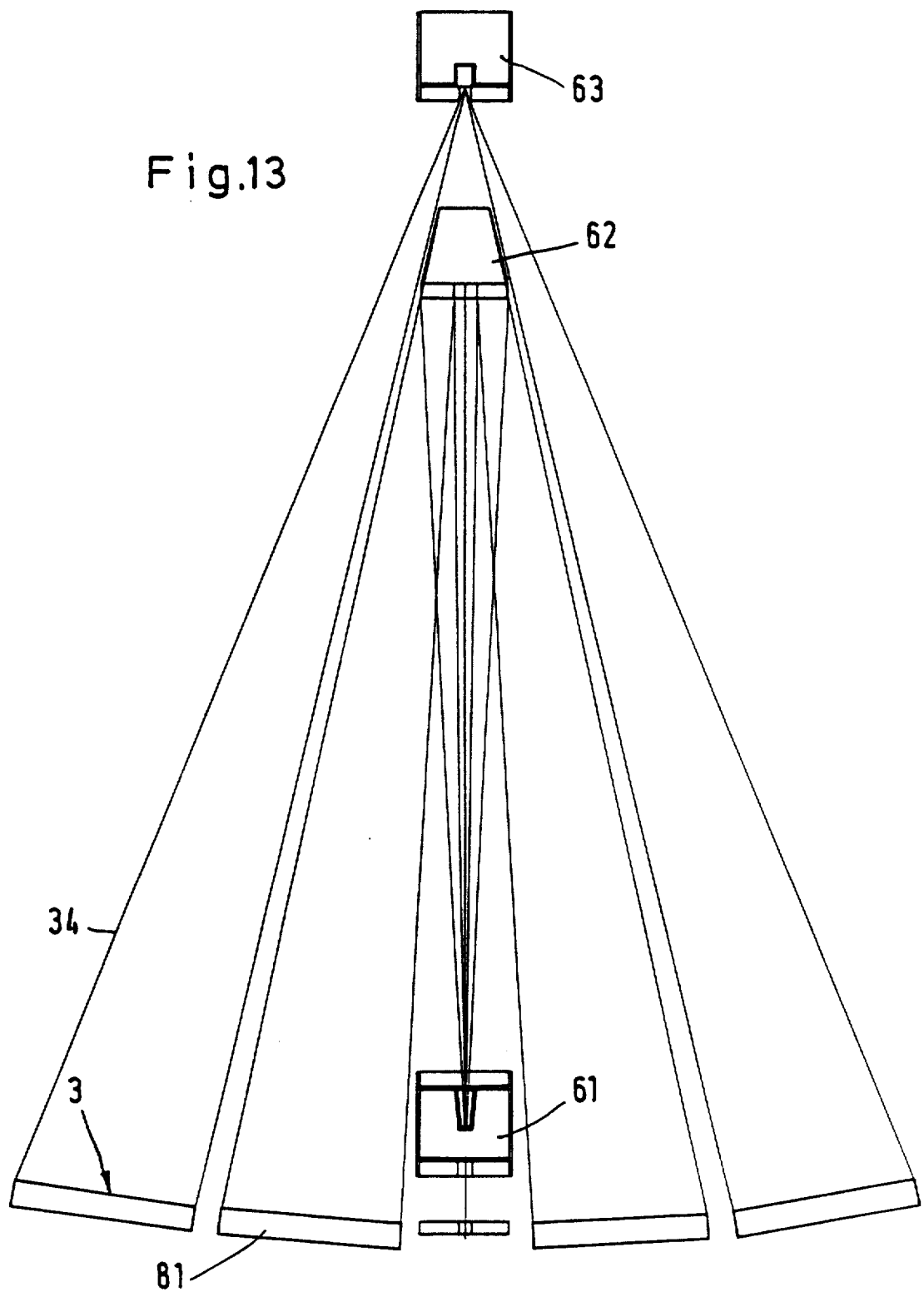
FIGS. 13 to 16 are schematic representations of the paths of rays for various kinds of observation.

FIGS. 13 to 16 show schematic representations of the paths of rays for different kinds of observation. FIG. 13, e.g., shows a primary focus with twelve reflector bodies and a simultaneous Cassegrain focus with six reflectors. The position of the observation cabins 61 to 63 corresponds here to the position according to FIG. 8.

Figure 14:
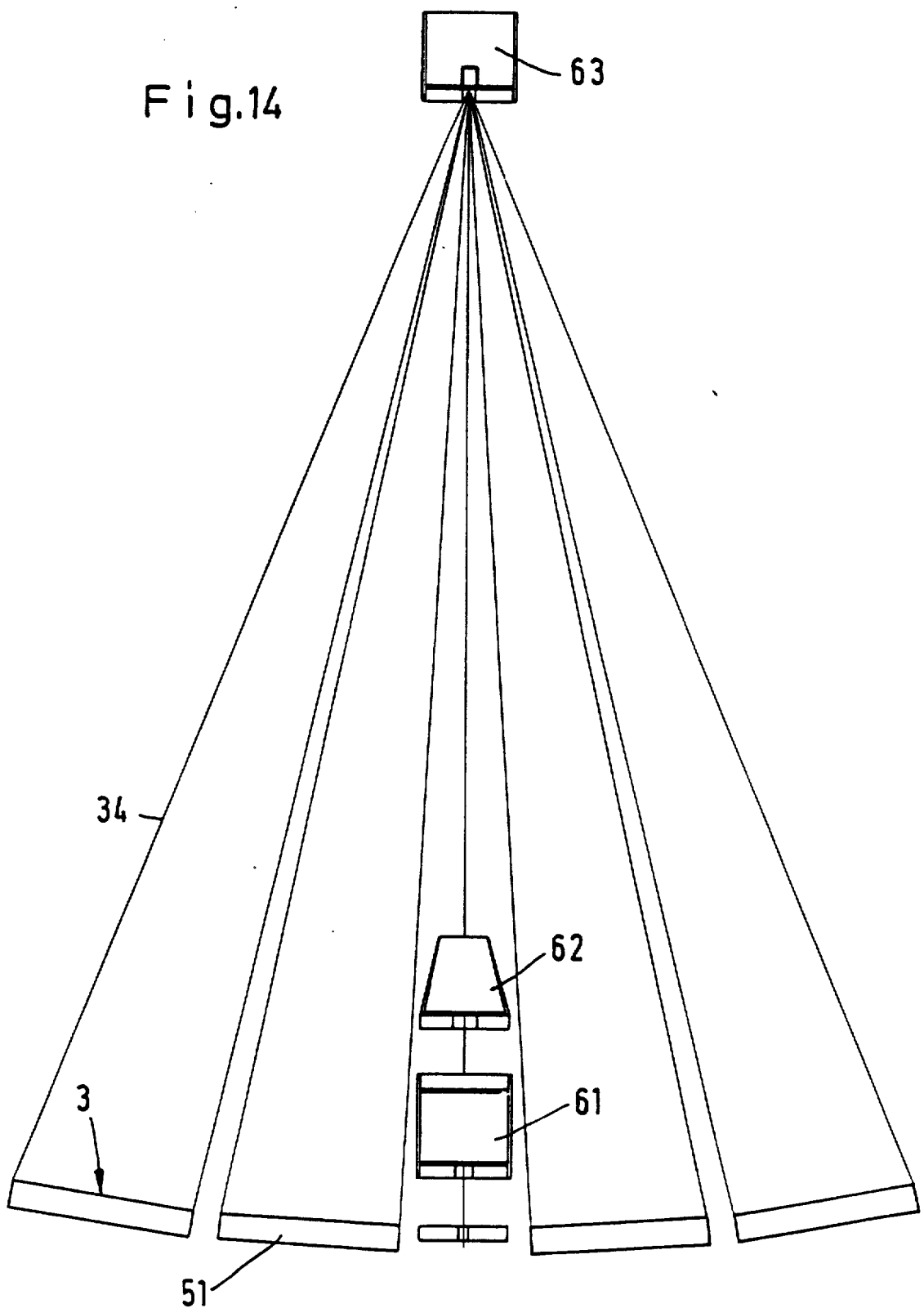

FIG. 14 shows the primary focus with eighteen reflectors in the upper observation cabin 63, the other two observation cabins 61 and 62 being moved downwards and being unused.

Figure 15:
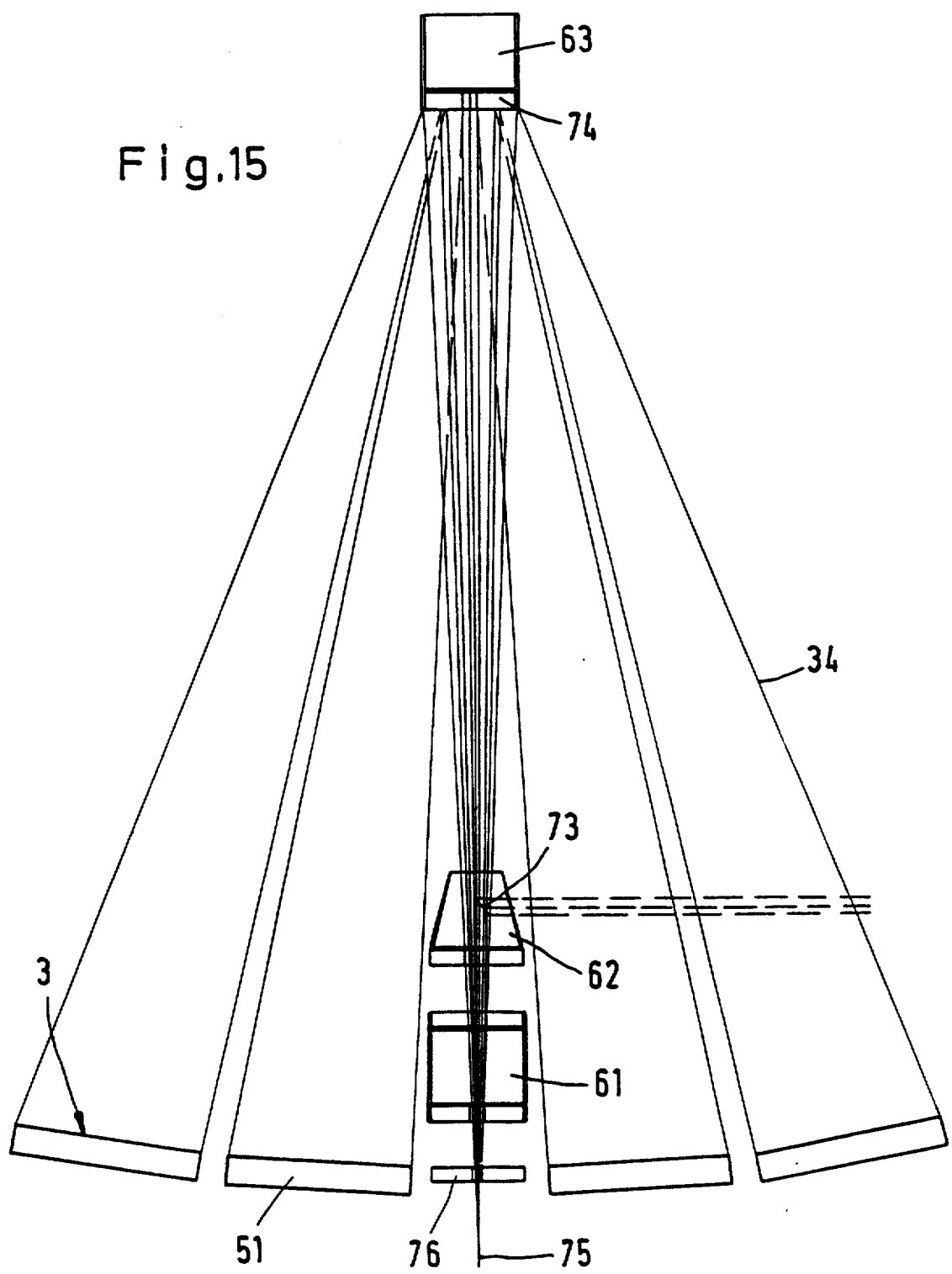

FIG. 15 shows the Cassegrain focus with eighteen reflectors and an iris-out possibility for the Coudé focus provided in the central observation cabin 62 by a secondary reflector 73. The upper observation cabin 63 carries at its lower side a secondary reflector 74. The ocular 75 for the Cassegrain focus is shown below a diaphragm 76.

Figure 16:
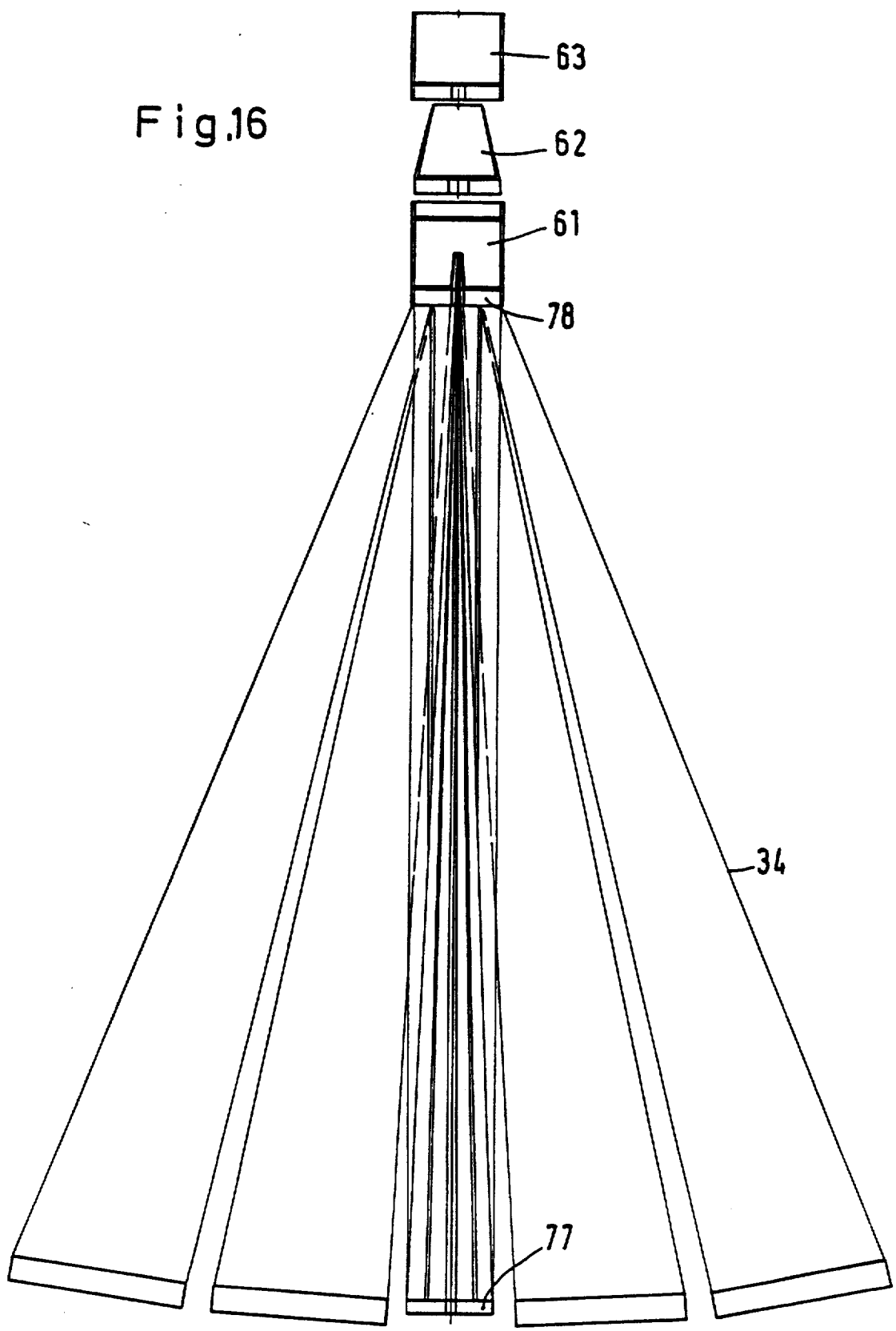

FIG. 16 shows the Cassegrain focus with eighteen reflectors and triple reflection by means of two reflectors 77, 78 being mounted on the diaphragm 76 or below the lower observation cabin 61, resp. The two upper observation cabins 62 and 63 are inactive.

In FIGS. 13 to 16, the marginal rays 34 of the respective reflector bodies 51 and the secondary reflectors 73, 74 and 77, 78 are represented.

Figure 17:
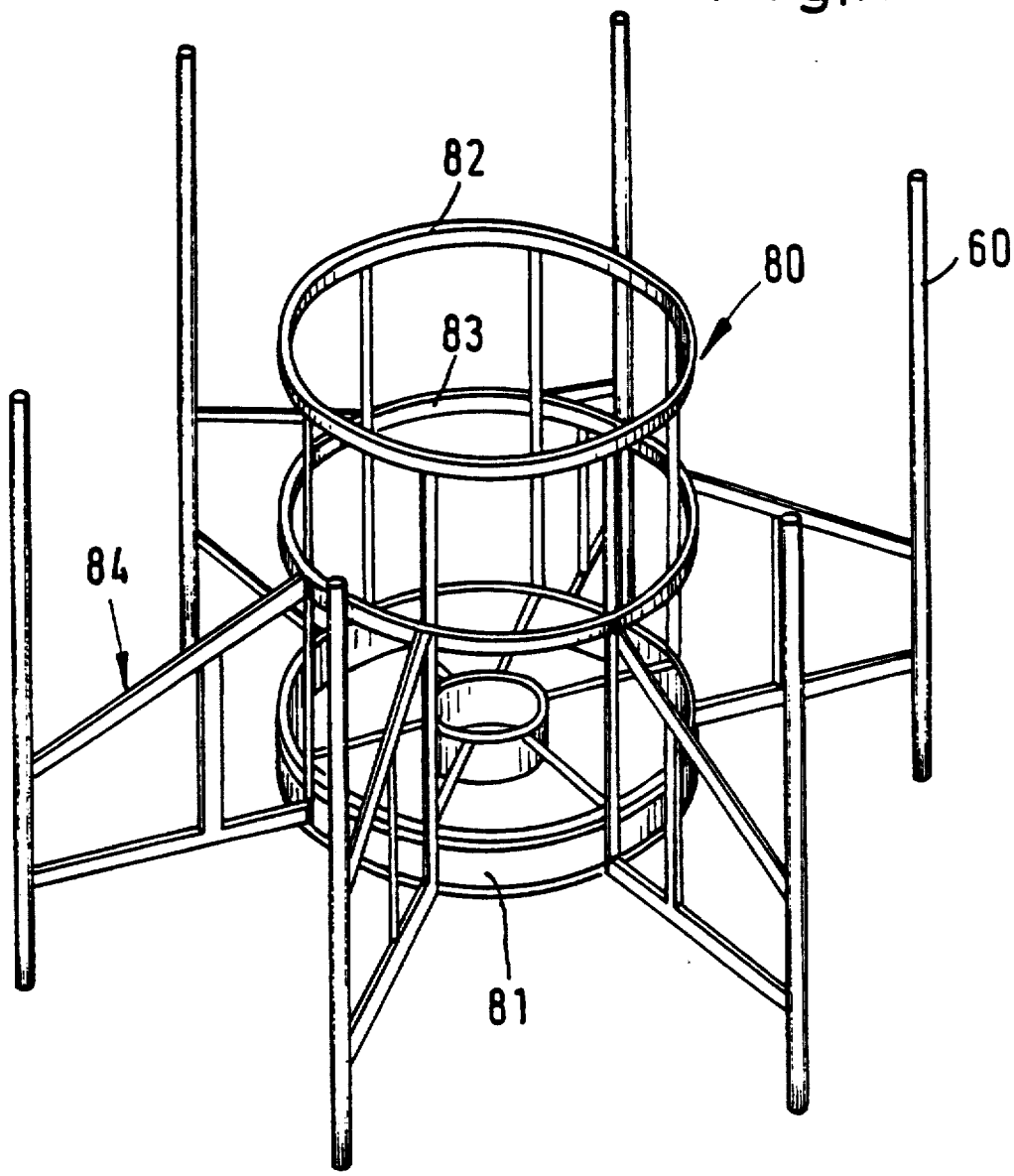
FIG. 17 is a perspective representation of the supporting bar structure.

In FIG. 17, the framework structure 80 for one of the observation cabins 61 to 63 is shown, consisting of a platform 81 receiving the secondary or deflection reflectors 73, 74 or 77, 78, resp., of two spaced support rings 82, 83 arranged above the platform 81 and of radial struts 84 being movably guided in the inner guide or walk rails 60 in vertical direction.

Figure 18:
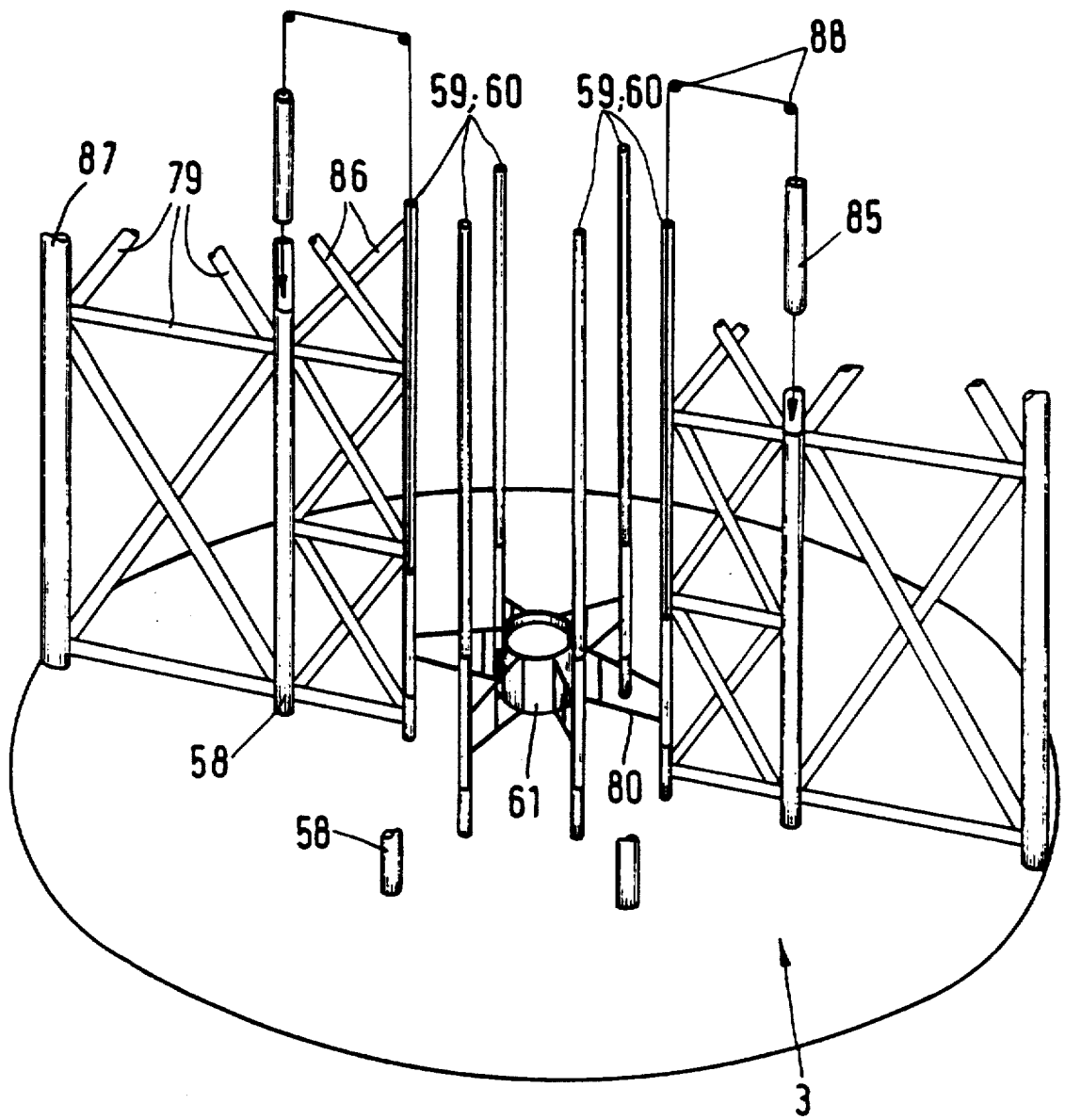
FIG. 18 is a partial representation of the supporting bar structure of FIG. 17.

FIG. 18 shows in a partially sectional perspective representation the framework structure 80 guided within the central axis 52 of the primary reflector 3 with the guide/walk rails 60 of the inner guide tubes 59. Over the grid struts 86 as static connection carriers, the inner guide tubes 59 are supported with respect to the central holder tubes 58, in which ballast weights 85 for weight compensation of the framework structures 80 of the three observation cabins 61 to 63 are guided. Over another grid system 79, the central holder tubes 58 are supported, further, by outer holder tubes 87.

Figure 19:
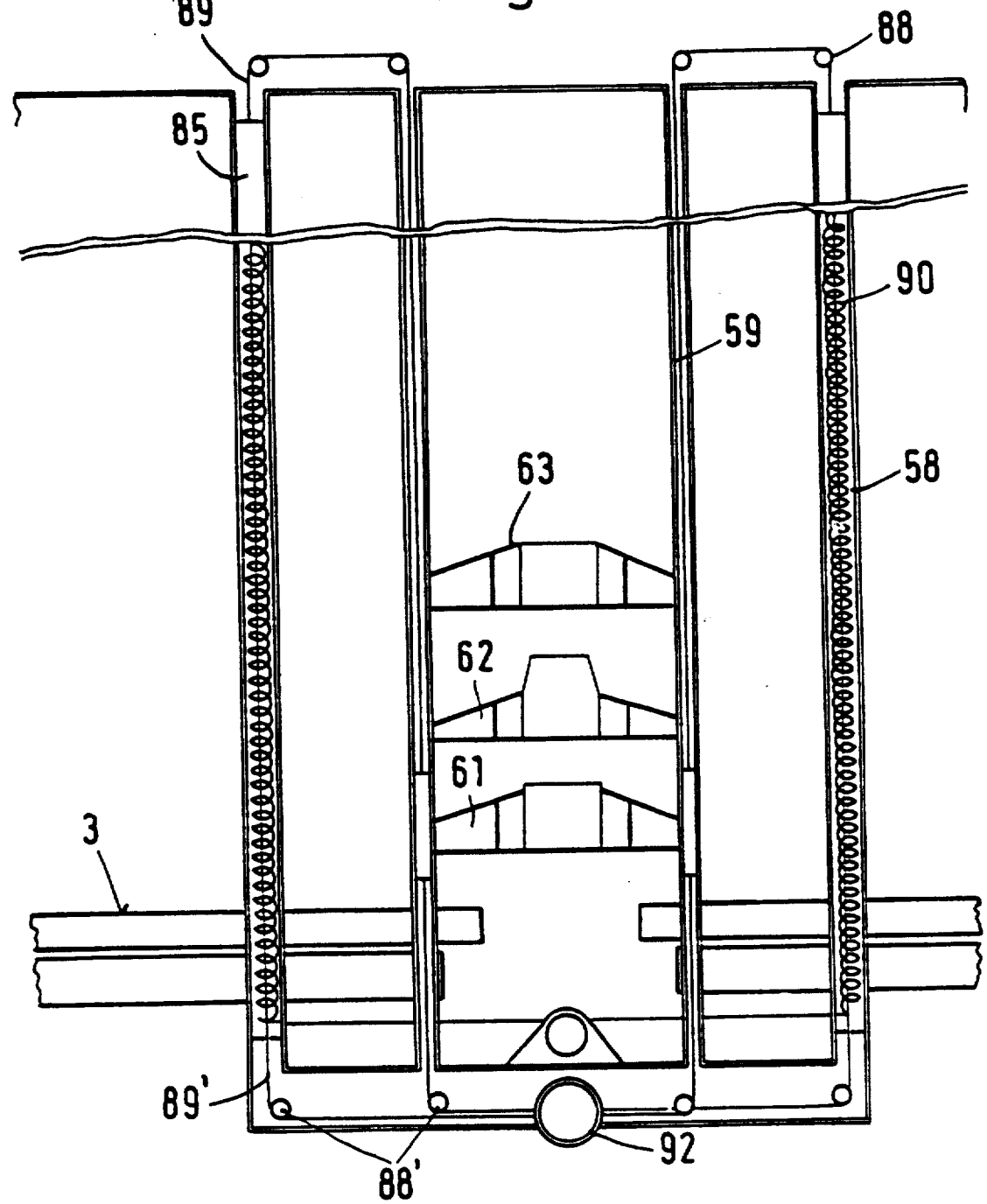
FIG. 19 is a section along the central axis through the supporting bars structure.

FIG. 19 shows in a simplified representation a vertical section through the supporting bars structure 56, the carrying cables 89 guided over guide rollers 88 being shown, said cables connecting the ballast weights 85 with the individual observation cabins 61 to 63. Over lower guide rollers 88', guide cables 89' for the ballast weights 85 are guided.

Figure 20:
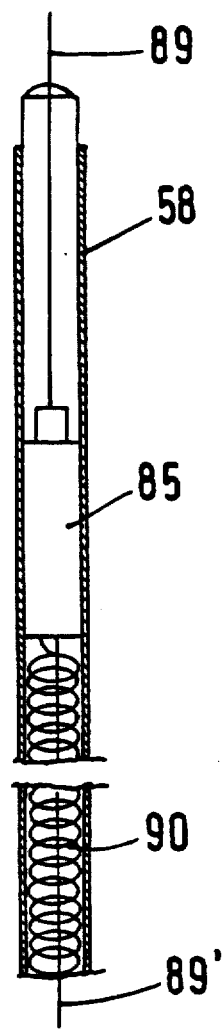
FIG. 20 is a longitudinal section through a guide tube.

According to FIG. 20, the ballast weights 85 guided in the central holder tubes 58 are designed as hollow parts and are connected with oil pressure hoses 90 and over the latter with an oil pump 91 such that the weight of the ballast weights 85 can be varied for the purpose of weight adaptation depending on the loading of the individual observation cabins 61 to 63. In a manner not shown in detail, control of the movement of the observation cabins 61 to 63 is effected by means of a central drive 92.

The three observation cabins 61 to 63 can, thus, be moved along the central axis 52, for which purpose the observation cabins 61 to 63 are supported in the six walk/guide rails 60. These walk rails 60 are supported under low friction in the guide tubes 59. Each observation cabin 61 to 63 is suspended at two opposite walk/guide rails 60. The two suspension mechanisms operating independently from each other of each observation cabin 61 to 63 are guided in the respective central holder tubes 58 such that the two ballast weights 85 assigned to each observation cabin 61 to 63 compensate the weight of the observation cabin 61 to 63. Thus, each observation cabin 61 to 63 is suspended with vertically a directed tube or supporting bar structure 56, resp., in the walk rail support. Following of the observation cabins 61 to 63 for accurate focus adjustment is, thus, considerably facilitated.

As in total six central holder tubes 58 with six guide tubes 59 are provided, the three observation cabins 61 to 63 can be moved independently from each other. With a diameter of approx. 2.4 m, each observation cabin 61 to 63 offers sufficient space for receiving up to four observing astronomers. The different loadings which might occur herewith can be compensated by that into the ballast weights 85 oil is filled, until the theoretical suspension state of the observation cabins 61 to 63 is achieved. Accuracy control can, then, be effected by means of load test devices not shown here in detail.

Movement of the carrying cables 89 and guide cables 89' as traction cables takes place according to FIG. 19 in a closed system, the central drive 92 being equipped with an electric motor not shown in detail arranged below the plane of the primary reflector 3. The carrying cables 89 are connected over the ballast weights 85 with the guide cables 89' and engage within the guide tubes 59 each at the respective observation cabin 61 to 63 at the guide rails 60 assigned thereto from above or from below, resp. Thus, a central control of the observation cabins 61 to 63 from the central drive 92 is effected.

Figure 23:
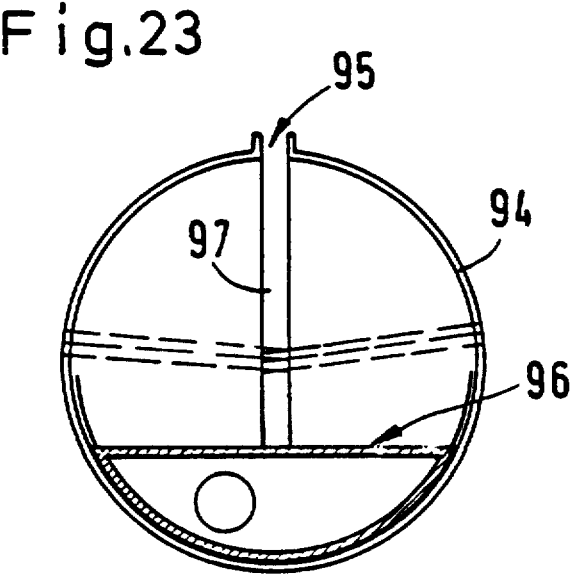
FIG. 23 is an axial section through a Coudé cabin.
Figure 21:
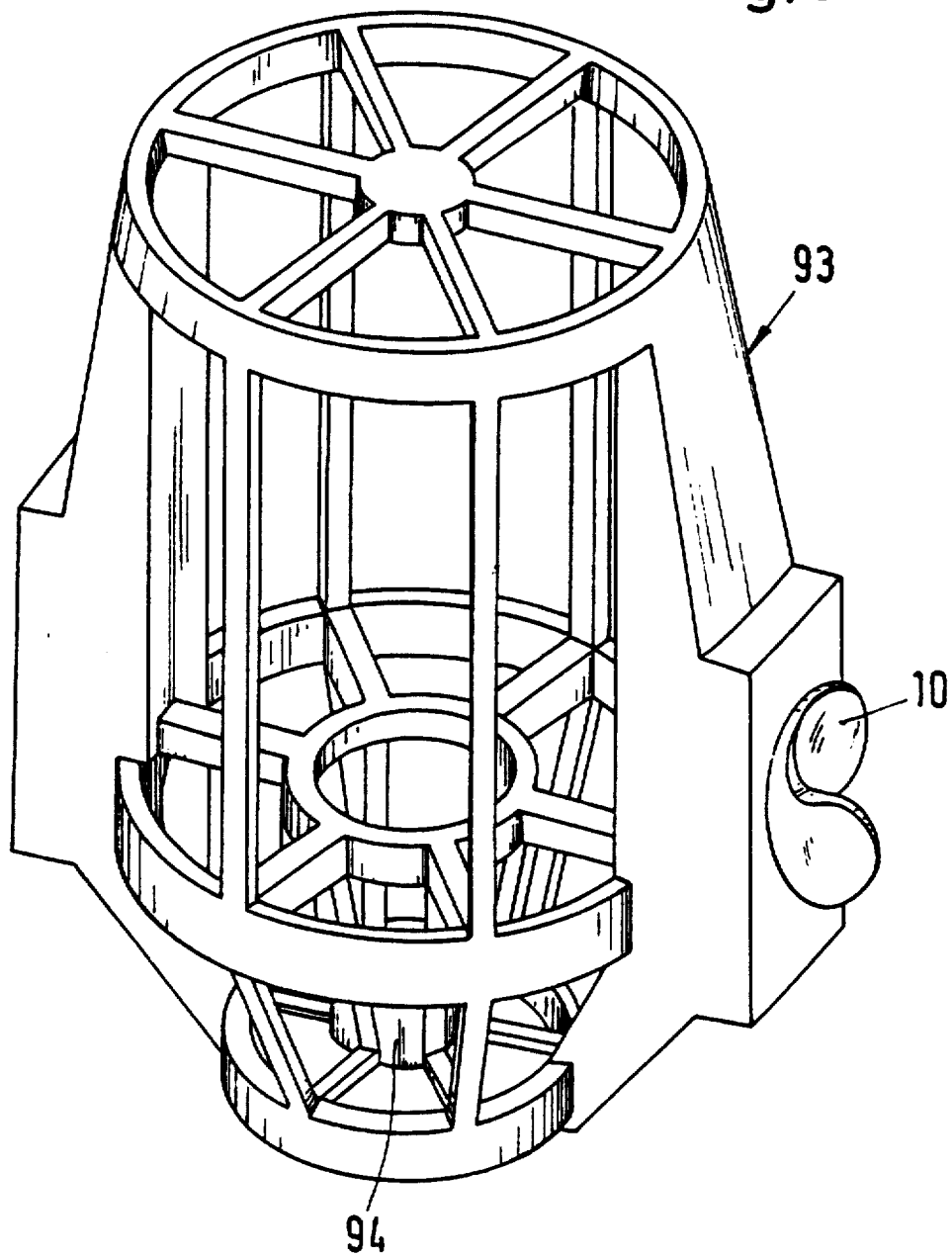
FIG. 21 is a perspective representation of the tube framework.
Figure 22:
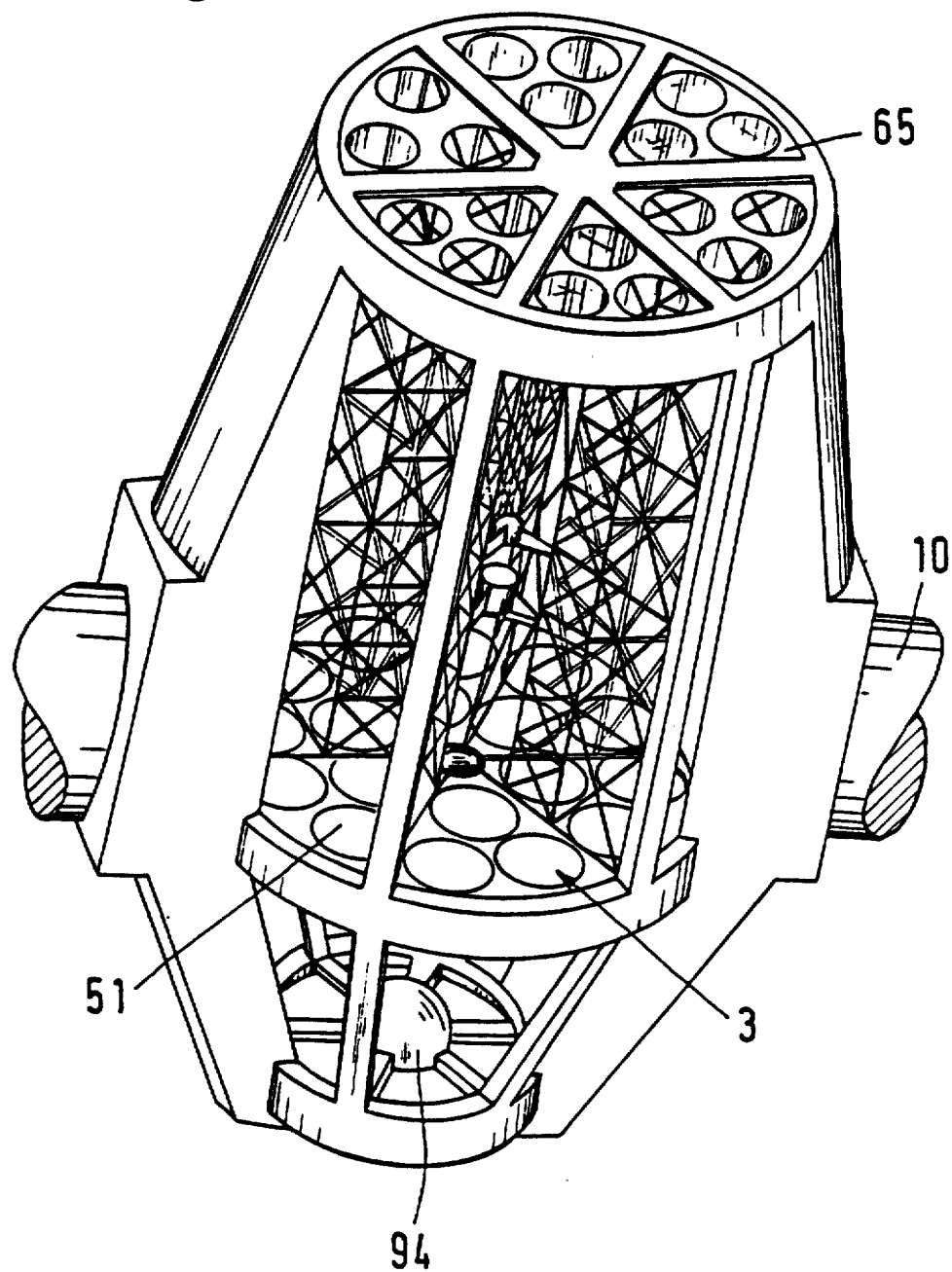
FIG. 22 is a perspective view of the final-assembled tube.

FIGS. 21 and 22 show in perspective representations the framework 93 of the tube, in which according to FIG. 22 the primary reflector 3, the supporting bars structure 56 arranged thereon with observation cabins 61 to 63 and the orifice plate 65 closing the tube are inserted or placed-on, resp. On the underside of the tube is a spherical observation cabin 94 for the Coudé focus with a circular light-admission window 95 being described in more detail in FIG. 23. The observation cabin 94 is rigidly connected with the tube. On an oil film and, thus, under very low friction, an inner platform 96 is supported horizontally for any position of the tube. As following of the tube takes place relatively slowly, vibration effects can practically be excluded. Air turbulences as a result of fresh-air admission do not affect performance, because constructional measures, e.g., an enveloping of the entering light bundle up to the measuring devices can be taken. Access to the spherical observation cabin 94 takes place over the admission window 95 for the light bundle. Cables for electrical supply are allowed by pipelines parallel to the light bundle enveloping 97 not shown in detail. The diameter of the circular platform 96 of the observation cabin 94 is approx. 8 m. Underneath the platform 96, there is, thus, within the spherical casing wall sufficient space for oil pressure and locking devices.

Finally, it is pointed out that the arrangement of the reflector bodies 51 on circular tracks extending concentrically to the central axis 52 applies, in principle, only for two concentric tracks of reflector bodies 51. For more than two circular tracks, the centers of the reflector bodies 51 lie, properly speaking, on the side lines of regular hexagons, as far as a dense arrangement of the reflector bodies 51 is desired.

I claim:

1. A reflector telescope, comprising: a tube including a supporting bar structure and a primary reflector housed in said tube and supported by said supporting bar structure; an outer framework mounted rotatably on a base structure for rotation about a vertical axis; outer framework hydrostatic slide bearing means positioned between said base structure and said outer framework for supporting said rotatable outer framework with respect to said base structure; a spherical casing rotatable with respect to said outer framework about a horizontal axis; spherical casing hydrostatic slide bearing means for supporting said rotatable spherical casing with respect to said outer framework; and, mounting means for mounting said tube within said spherical casing thereby improving the reflector telescope picture quality by increasing the stability of the optical axis for high dimension reflectors.

2. A reflector telescope according to claim 1, further comprising walk tubes having a horizontal axis connected to said spherical casing and walk platforms positioned slidably in said walk tubes, said walk platforms being connected to said outer framework providing a level walkway between said outer framework and said spherical casing.

3. A reflector telescope according to claim 2, wherein said walk platform is supported within an associated wall tube by hydrostatic bearing sockets.

4. A reflector telescope according to claim 1, wherein said spherical casing includes elevators connected with said walk tubes, said elevators including walls formed with spherical segments connected with stand platforms, said walls and said stand platform being rotatable within said elevator.

5. A reflector telescope according to claim 1, wherein said primary reflector comprises a plurality of individual reflector segments, each of said reflector segments being supported on circular disk tracks concentric to a central axis of said tube.

6. A reflector telescope according to claim 5, wherein said reflector segments of said primary reflector are each formed of circular-disk shaped bodies, each of said reflector segments having a surface which cooperates with other reflector segments to define a paraboloid shape, said reflector segments being positioned to define free spaces between adjacent segments, a bearing arrangement associated with each reflector segment, positioned in said free space, said bearing bar structure being connected at said free space being formed such that shadow areas of said bearing bar structure fall on said free space.

7. A reflector telescope according to claim 1, wherein said primary reflector defines a diameter which is greater than or equal to 10 meters.

8. A reflector telescope, comprising: a tube including a supporting bar structure and a primary reflector housed in said tube and supported by said supporting bar structure; an outer framework mounted rotatably on a base structure for rotation about a vertical axis; outer framework hydrostatic slide bearing means positioned between said base structure and said outer framework for supporting said rotatable outer framework with respect to said base structure; a spherical casing rotatable with respect to said outer framework about a horizontal axis; spherical casing hydrostatic slide bearing means for supporting said rotatable spherical casing with respect to said outer framework; and, mounting means for mounting said tube within said spherical casing thereby improving the reflector telescope picture quality by increasing the stability of the optical axis for high dimension reflectors; a horizontal walk tube rigidly connected with said spherical casing positioned substantially along said horizontal axis of said spherical casing; and, a walk platform rigidly connected to said outer framework and positioned within said walk tube and slidably mounted within said walk tube for movement with respect to said walk tube upon rotation of said spherical casing with respect to said outer framework.

9. A reflector telescope according to claim 8 wherein said spherical casing is made of carbon-fiber material.

10. A reflector telescope according to claim 8 wherein said primary reflector is arranged in said tube and comprises a plurality of individual adjustable reflector segments supported on circular tracks concentric to a central axis of the tube, secondary or deflection reflector displaceable along the central axis on a supporting bars structure, and observation cabins for the various foci, said reflector segments being formed of circular-disk-shaped reflector bodies (51), the surfaces of which are ground commonly for forming the required paraboloid shape of the primary reflector (3), between the individual reflector bodies (51), free spaces (53, 55) are provided for the bearings (54) of the reflector bodies (51) and for the supporting bars structure (56) or for its shadow areas.

11. A reflector telescope according to claim 10, wherein the observation cabins (671, 62, 63) are provided with said secondary or deflection reflectors (73, 74, 77, 78) and are supported to move freely along the central axis (52) of the tube (2).

12. A reflector telescope according to claim 10, wherein the supporting bar structure on an entrance-side of the tube (2) is formed of an orifice plate (65) with openings (66), the arrangement and diameter of which correspond to the arrangement and to the diameter of the reflector body (51) of the primary reflector (3).

13. A reflector telescope according to claim 10, wherein the supporting bar structure (56) comprises holder tubes (58) forming a static carrier structure for the tube (2) and inner guide tubes (59) provided with guide rails (60) for guiding three observation cabins (61 to 63).

14. A reflector telescope according to claim 13, wherein the observation cabins (61 to 63) are provided with said secondary or deflection reflectors (73, 74; 77, 78) and are freely movable along the central axis of the tube.

15. A reflector telescope according to claim 10, wherein the bearings (54) of each reflector (51) are adjustable.

16. A reflector telescope according to claim 15, wherein the adjustment of position of each reflector body (51) is effected by means of laser pulse transmitters (67) being arranged at the border of each reflector body (51) and providing pulses to a receiver (68) arranged above at the orifice plate (66) and controlled by a computer.

17. A reflector telescope according to claim 8, wherein each observation cabin (61 to 63) is provided with a framework structure (8) including a platform (81) receiving one of secondary and deflection reflectors (73, 74; 77, 78), two support rings (82, 83) arranged spaced above the platform (81), and two radial struts (84) being guided movably in vertical direction in the inner guide or walk tubes (60).

* * * * *